US008511644B2

(12) United States Patent
Biesse

(10) Patent No.: US 8,511,644 B2

(45) Date of Patent: Aug. 20, 2013

(54) PUSH BAR FOR PUSHING A STUCK VEHICLE

(76) Inventor: Philippe Biesse, Bellegarde (FR)

(*) Notice: Subject to any disclaimer, the term of this patent is extended or adjusted under 35 U.S.C. 154(b) by 1095 days.

(21) Appl. No.: 11/910,911

(22) PCT Filed: Apr. 3, 2006

(86) PCT No.: PCT/FR2006/000745

§ 371 (c)(1), (2), (4) Date: Oct. 5, 2007

(87) PCT Pub. No.: WO2006/106227

PCT Pub. Date: Oct. 12, 2006

(65) Prior Publication Data

US 2009/0146118 A1 Jun. 11, 2009

(30) Foreign Application Priority Data

Apr. 6, 2005 (FR) ..................................... 05 03454

(51) Int. Cl.

| | |
|---|---|
| ***B60S 9/22*** | (2006.01) |
| ***B66F 3/10*** | (2006.01) |
| ***B66F 3/00*** | (2006.01) |
| ***B60C 11/00*** | (2006.01) |
| ***B60C 27/00*** | (2006.01) |
| ***E01B 29/00*** | (2006.01) |
| *B66F 19/00* | (2006.01) |

(52) U.S. Cl.

USPC ............. 254/35; 254/102; 254/124; 152/222; 238/14

(58) Field of Classification Search

USPC ........... 254/35, 101, 102, 133, 124; 152/222; 238/14

See application file for complete search history.

(56) References Cited

U.S. PATENT DOCUMENTS

| | | | | | |
|---|---|---|---|---|---|
| 310,492 | A * | 1/1885 | Barnes | ............................ | 254/35 |
| 405,012 | A * | 6/1889 | Chrisman | ....................... | 254/35 |
| 423,437 | A | 3/1890 | Mellenthin | | |
| 1,035,966 | A * | 8/1912 | Hoover et al. | .................. | 254/35 |
| 1,500,249 | A * | 7/1924 | McCracken et al. | ............ | 238/14 |
| 2,060,526 | A * | 11/1936 | Peterson | ......................... | 254/35 |
| 2,391,657 | A * | 12/1945 | Tavelin | ........................... | 105/31 |
| 2,428,680 | A * | 10/1947 | Piatak | ............................. | 238/14 |
| 2,473,109 | A * | 6/1949 | Schneider | ........................ | 254/35 |
| 3,029,065 | A * | 4/1962 | Buddingh | ....................... | 254/35 |
| 3,099,435 | A * | 7/1963 | Nixon | ............................. | 254/35 |
| 3,672,422 | A * | 6/1972 | Greipel | ......................... | 152/222 |

(Continued)

FOREIGN PATENT DOCUMENTS

FR 2 559 176 A 8/1985

*Primary Examiner* — Alvin J Grant

(57) ABSTRACT

Device that uses the force of one or several persons to help a stuck vehicle get free. It comprises a set of chains of blocks (2) to put in front of the wheels and that are connected by straps (3.6) to a system that will pull them under the wheels while pushing the car by reaction. The forces come from a lever system consisting of a main bar with a triangular part fixed underneath and near its front end. When the operator lifts the bar, the displacement of the extremities of the triangular part away from the wheels creates a pull on the straps while the front end of the bar pushes the car. The blocks become the fulcrum of this lever system. Alternately, a winch fixed on the car bumper pulls on the straps via deviation rollers or rings, transmitting the reaction pushing forces to the car rear part.

18 Claims, 18 Drawing Sheets

(56) References Cited

U.S. PATENT DOCUMENTS

| | | | | |
|---|---|---|---|---|
| 4,261,510 | A * | 4/1981 | Andrus | 238/14 |
| 4,265,399 | A * | 5/1981 | Covington | 238/14 |
| 4,280,684 | A * | 7/1981 | LeVert | 254/35 |
| 4,361,277 | A * | 11/1982 | Cannady et al. | 238/14 |
| 4,534,508 | A | 8/1985 | Willner, Jr. et al. | |
| 4,568,020 | A * | 2/1986 | Gallichan | 238/14 |
| 4,729,547 | A | 3/1988 | Bleier et al. | |
| 5,402,941 | A | 4/1995 | MacLeod et al. | |
| 6,129,289 | A * | 10/2000 | Morin, Jr. | 238/14 |
| 6,543,501 | B2 * | 4/2003 | Ferreira | 152/225 R |
| 6,779,738 | B1 * | 8/2004 | Stannard | 238/14 |
| 7,350,719 | B1 * | 4/2008 | Brenner | 238/14 |
| 7,469,958 | B2 * | 12/2008 | Hastings | 296/193.1 |
| 2008/0203741 | A1 * | 8/2008 | Hastings | 293/115 |

* cited by examiner

PUSH BAR FOR PUSHING A STUCK VEHICLE

TECHNICAL FIELD

This invention relates to a system that helps a regular or off road vehicle recover from a situation where its wheels are stuck in sand, mud, snow, ice or any other sort of soft and slippery track material. The word stuck refers here to the ideas of penetration of the wheels into the soil and of lack of traction of the wheels on the track material.

BACKGROUND ART

It is known in the vehicle art to use traction boards that function as support and anti skid devices when placed in front of the traction wheels of a stuck vehicle, to use shovels to free the vehicle, to pull it with a winch and a cable attached to an anchorage point, to use special tires or chains in the case of snow or even to reduce the tire pressure to increase the contact surface and grip.

Alternatively one can also pull or push the vehicle by means of another vehicle, animals or men. The main drawbacks of these solutions are that they require means like a strong anchoring point, storage capacity for the traction boards, the availability of other vehicles, men or animals for pushing. Also, reducing tire pressure is not recommended and men can get injured when pushing or pulling a vehicle. These solutions do not prevent from getting stuck again further down on the track.

DISCLOSURE OF THE INVENTION

In accordance with the present invention, the vehicle pushing device will overcome all these drawbacks.

It consists primarily in the use of a lever bar to push the vehicle outside of the track holes, in combination with the use of part of the vehicle weight that helps form anchoring points and with the strength of one or several men.

Alternatively a manual or an electrical winch can be used instead of the men's force.

The invention can also allow the mounting around the wheels of anti-skid systems that will prevent getting stuck again. The standard arrangement consists in laying in front of each wheel a chain made of anti-skid blocks connected together by cables, and whose front extremity faces the back of the vehicle and is connected by straps to the triangular part of a lever bar swiveling around the trailer coupling ball.

The triangle is in a plane more or less perpendicular to the direction of the bar and the hooking points of the straps are located in a plane lower than the bar. Lifting the bar from its horizontal position makes these hooking points move away from the vehicle, and pull on the chains of blocks while the front end of the bar pushes the trailer coupling ball, all of these actions creating a relative movement of the vehicle onto the top of the blocks which then form a fulcrum as they become anchored into the ground by the load, allowing now for the vehicle to move forward in relation to the ground and forming a new solid track for the moving vehicle.

There are different possible configurations for the vehicle pushing device according to the ratio of force to movement to obtain. It is also possible to replace the movement of the triangle and the lever effect of the bar on the straps by the pull of a winch (or tie-down) that would be fixed directly to the rear structure of the car or on a part of such bar that in turn is connected to the rear of the car.

BRIEF DESCRIPTION OF THE DRAWINGS

FIG. 2 shows the flat end of the bar (1.4.1), connecting pin (1.4.2) to the vehicle trailer coupling ball, main connecting assembly (1.4*a*) with safety pin (1.4.3*a*).

FIG. 3 shows the flat end of the bar (1.4.1), connecting pin (1.4.2) to the rear bumper assembly, main rear bumper assembly (1.4*b*) with connecting system (1.4.3*b*).

The detailed drawing represents the pivot with axle (1.11), the triangle (1.2), the guide bar of the triangle (1.12) with holes as shown to introduce the one way pin (1.12*a*) or the two way NI pin (1.12*b*).

Figure 1:
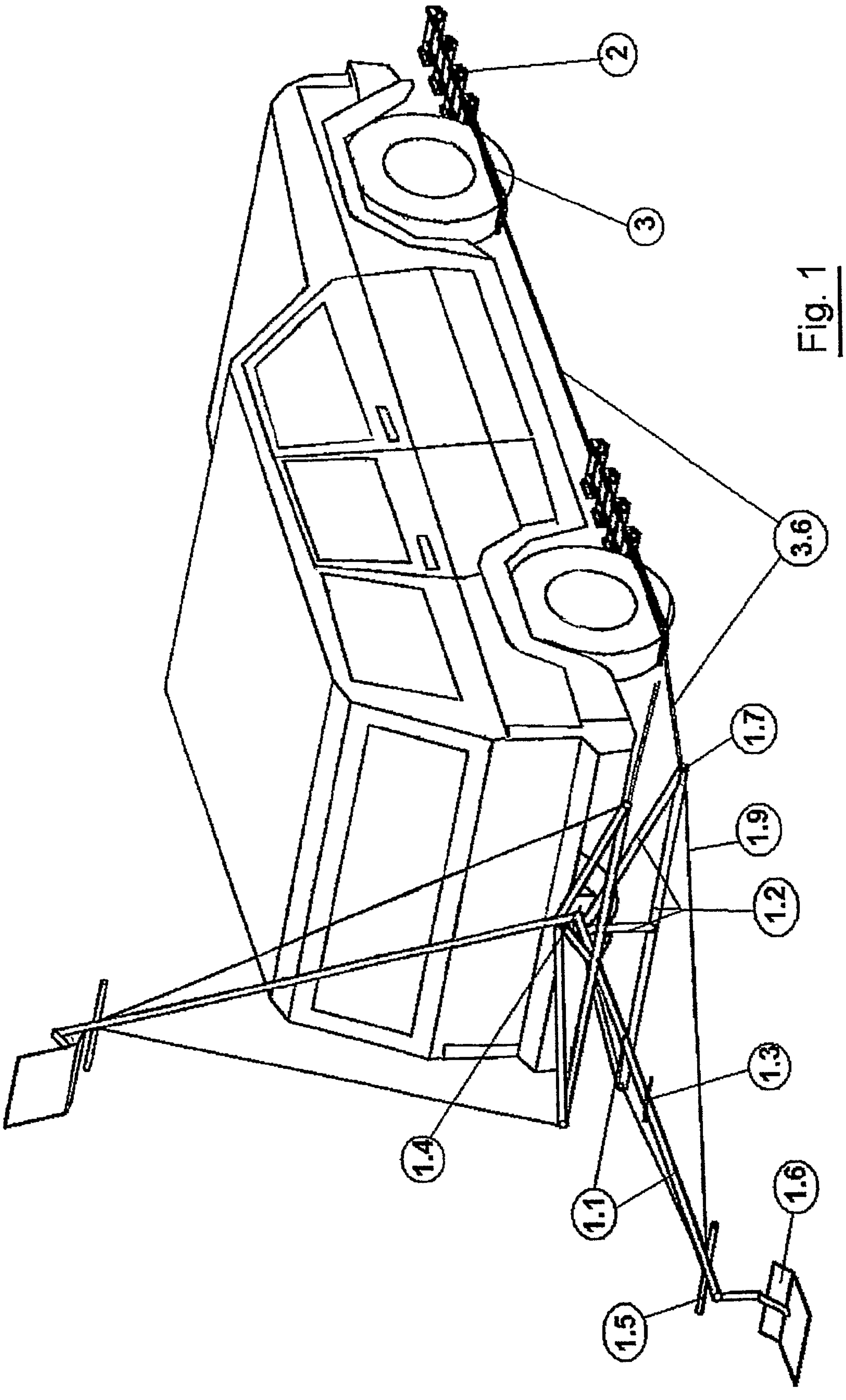
FIG. 1 represents the general principle of the vehicle pushing device according to the first arrangement. Bar with its composing elements (1.1), triangle (1.2), pins (1.3), fixing assembly to the vehicle (1.4), handles (1.5), shovel or ladle (1.6), triangle end rings (1.7), set of bar straps or cables (1 9), chain of blocks (2), connecting system (3), and set of connecting straps (3.6).
Figure 2:
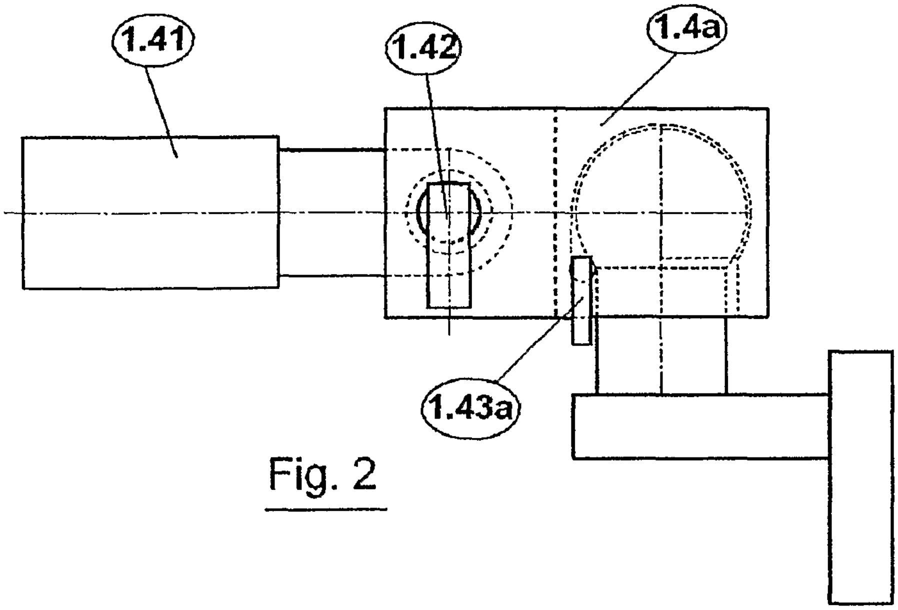
FIGS. 2 and 3 represent anchoring points of the bar to the rear part of the vehicle according to the first arrangement.
Figure 3:
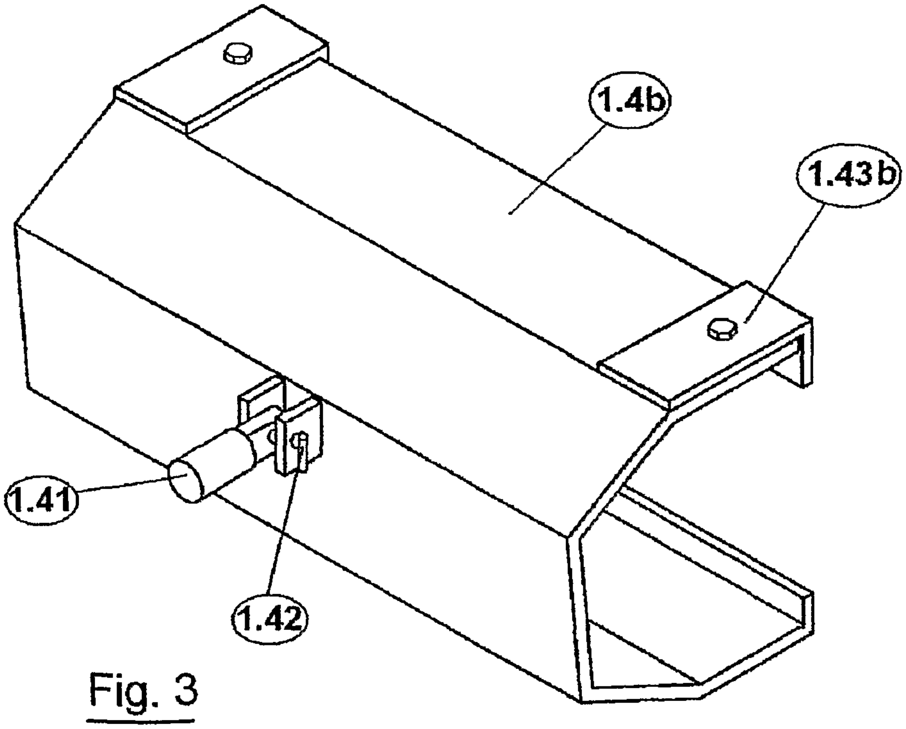
Figure 4:
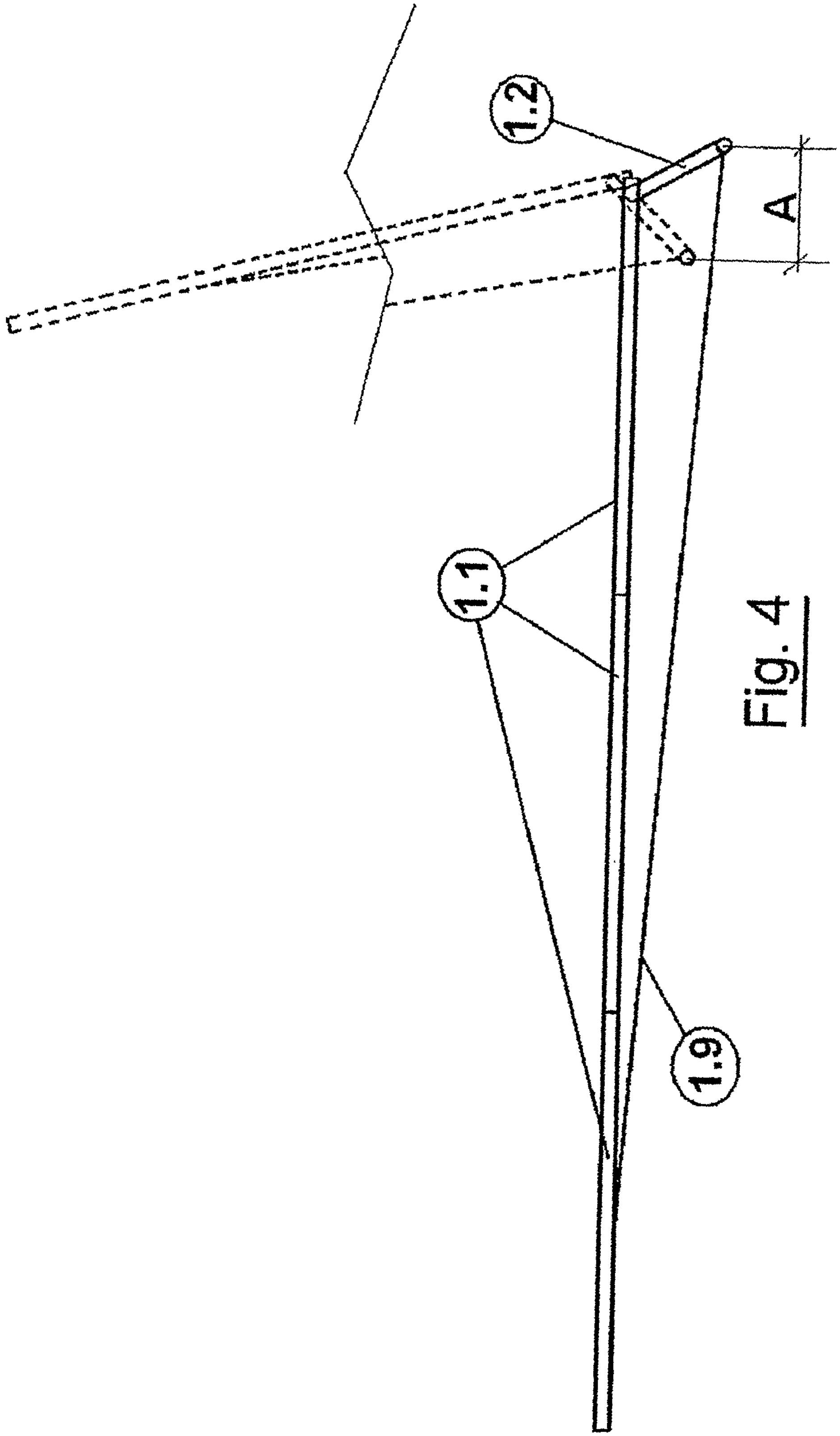
FIG. 4 represents the side view of a bar according to the third arrangement. Bar elements (1.1) with triangle (1.2) shown in low and high positions. The travel A is optimized for an angle between around −30 and +30 degrees.
Figure 5:
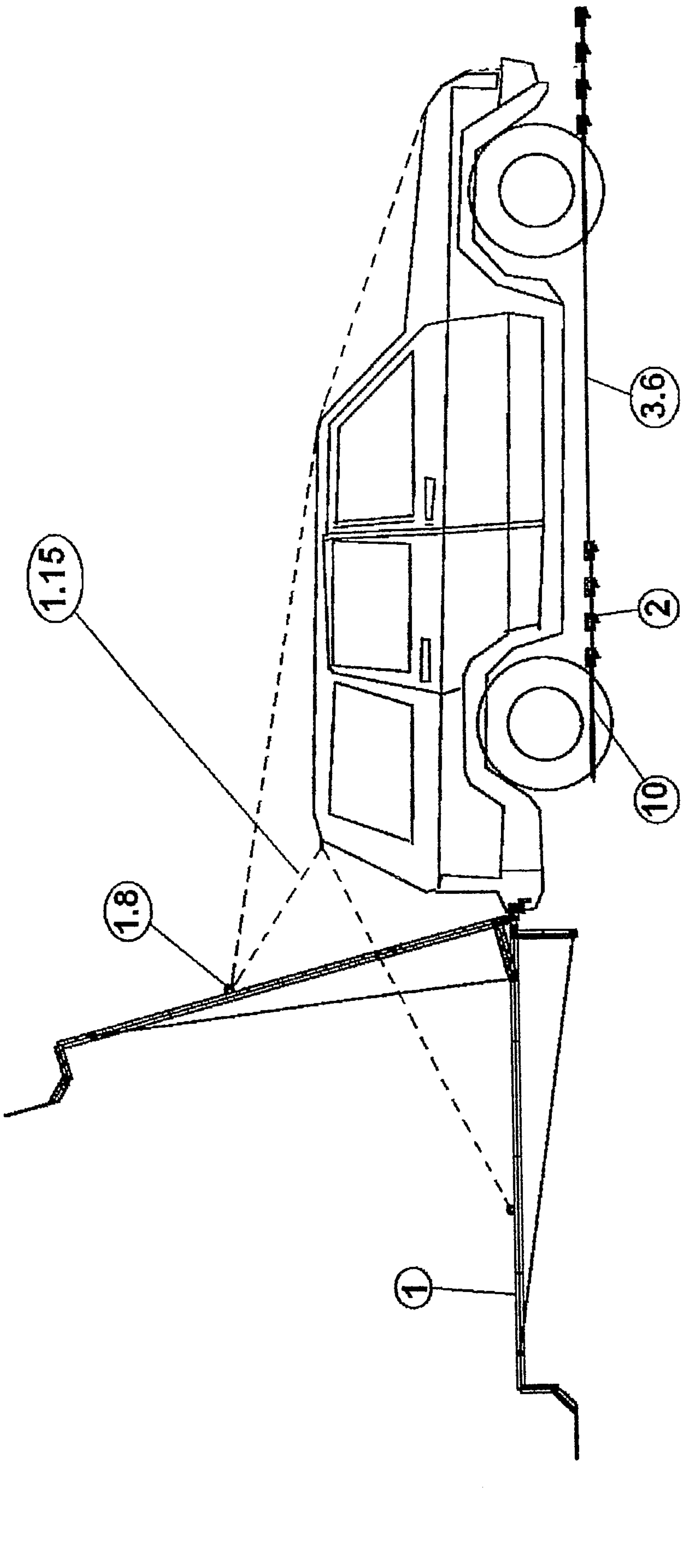
FIG. 5 represents a bar with rings and straps according to the fourth arrangement. Standard bar with ring (1.8) and strap (1.15) shown in low position with strap attached to the car roof; in high position with strap attached to the car roof, and in high position with strap attached at the front of the vehicle.
Figure 6:
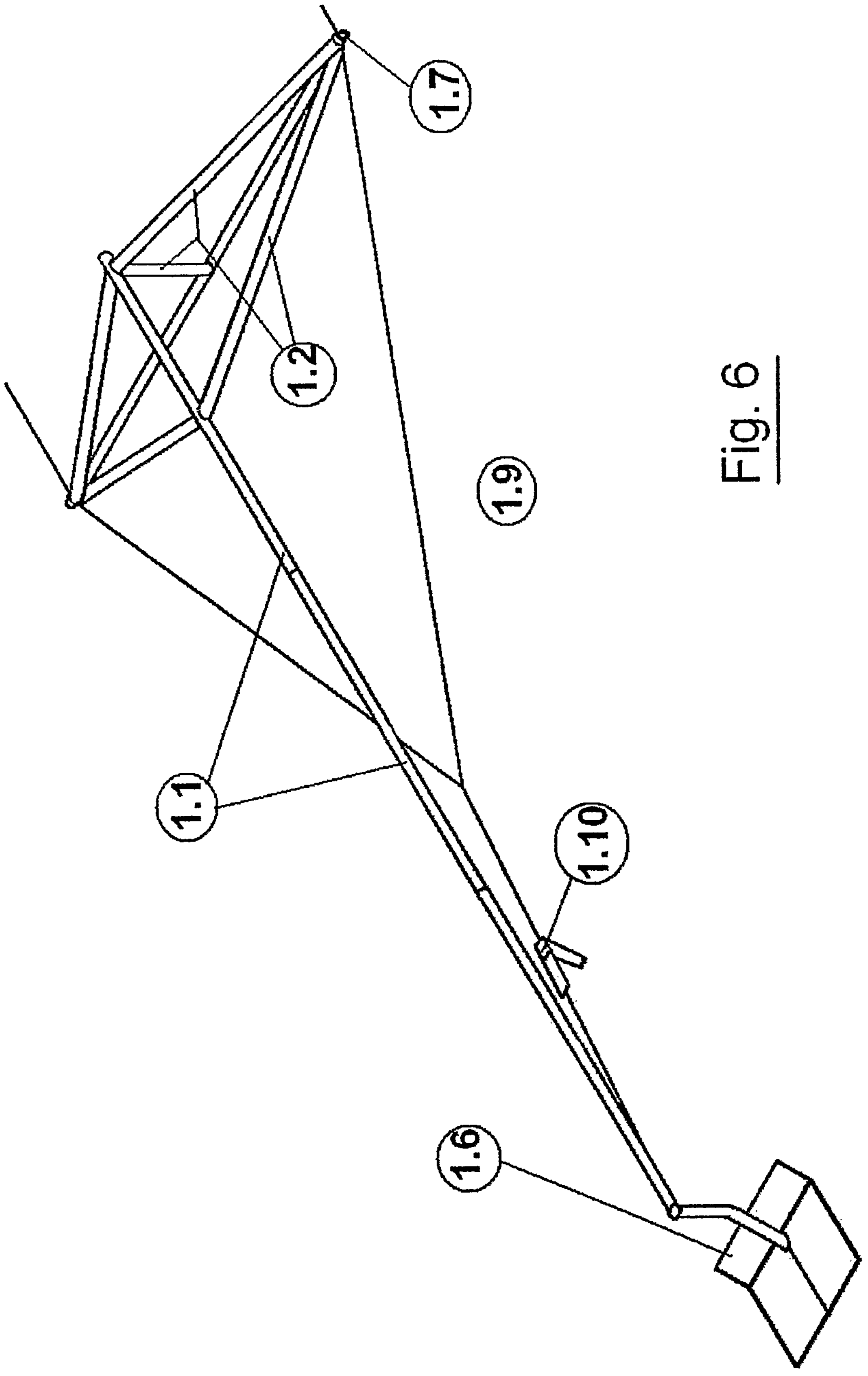
FIG. 6 represents a bar with ratchet tie down according to the fifth arrangement. Bar with elements (1.1), triangle (1.2) reinforced in horizontal plane by bracings, triangle end rings (1.7), shovel (1.6), and ratchet tie down (1.10).
Figure 7:
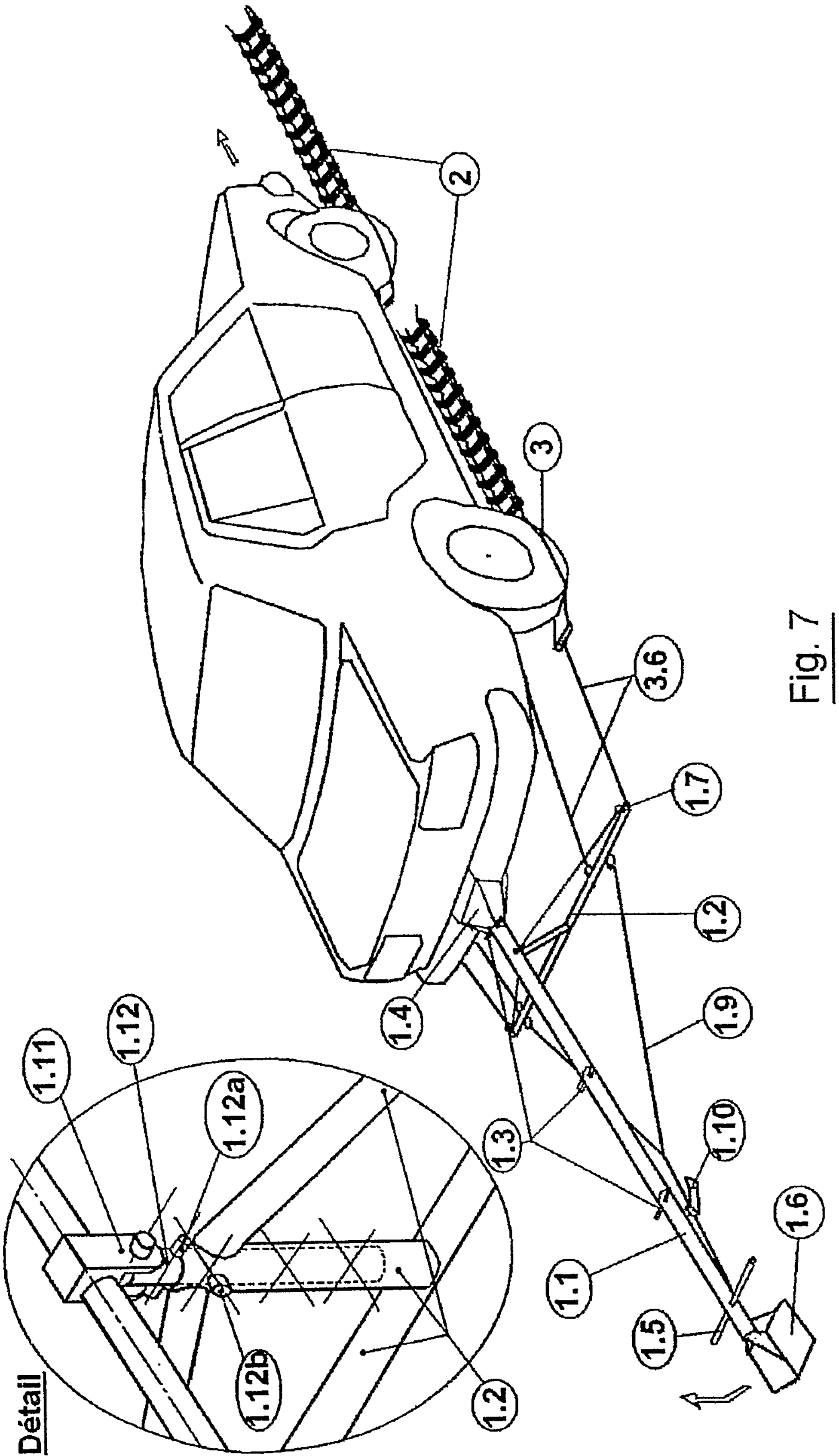
FIG. 7 represents a bar with articulated triangle according to the sixth arrangement. Bar with elements (1.1), triangle (1.2), pins (1.3), anchoring point on the vehicle (1.4) handles (1.5), shovel (1.6), triangle end rings (1.7), ratchet tie down (1.10) and set of straps or cables (1.9) and (3.6), 4 chains of blocks (2) and connecting system of the blocs blocks to the bar (3).
Figure 8:
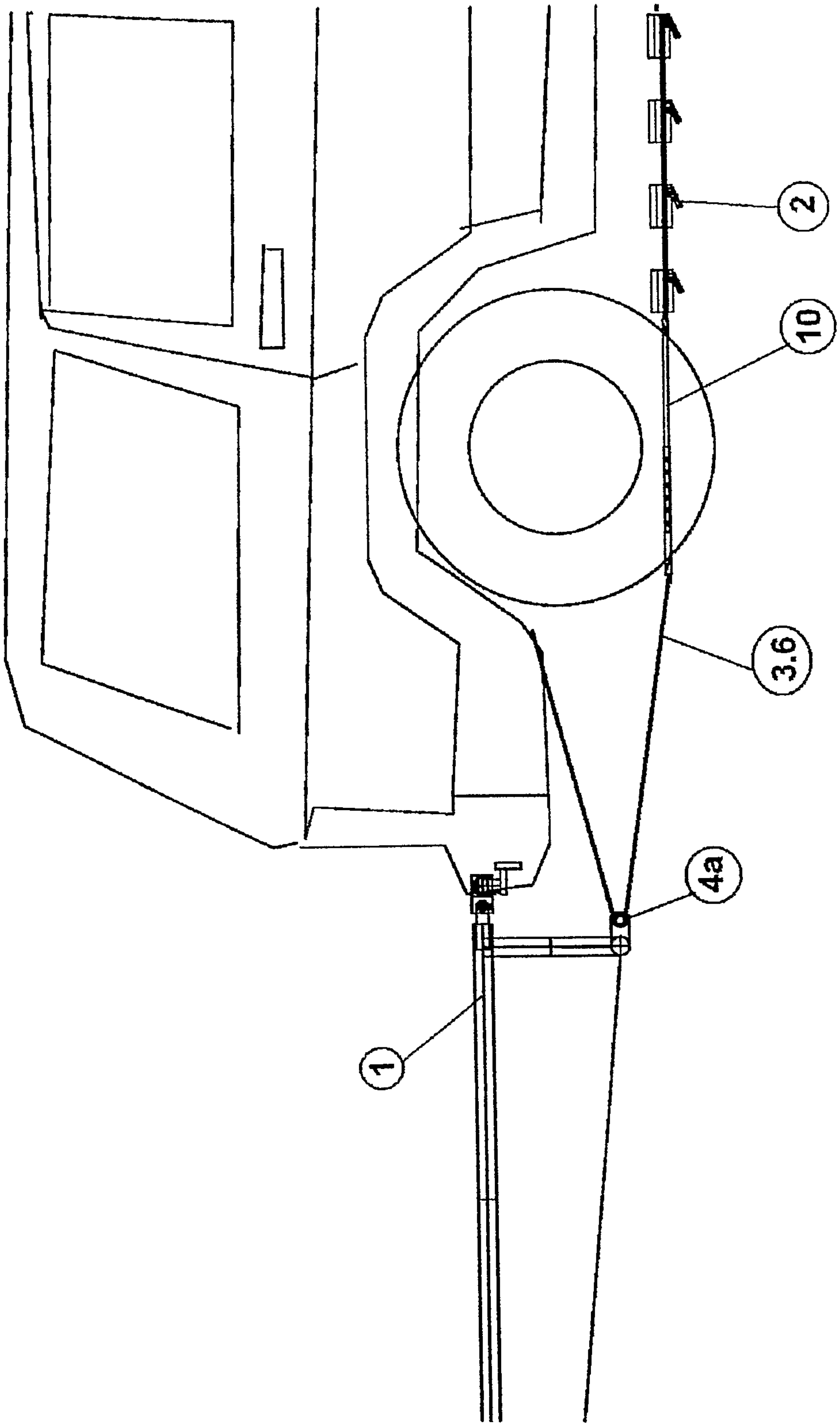

FIG. 8 represents a bar with idler pulleys fixed on the triangle according to the seventh arrangement. Bar (1), chain of blocks (2), adjustable bar connecting system (10), idler pulley (4*a*), straps (1.9) and (3.6).

Figure 9:
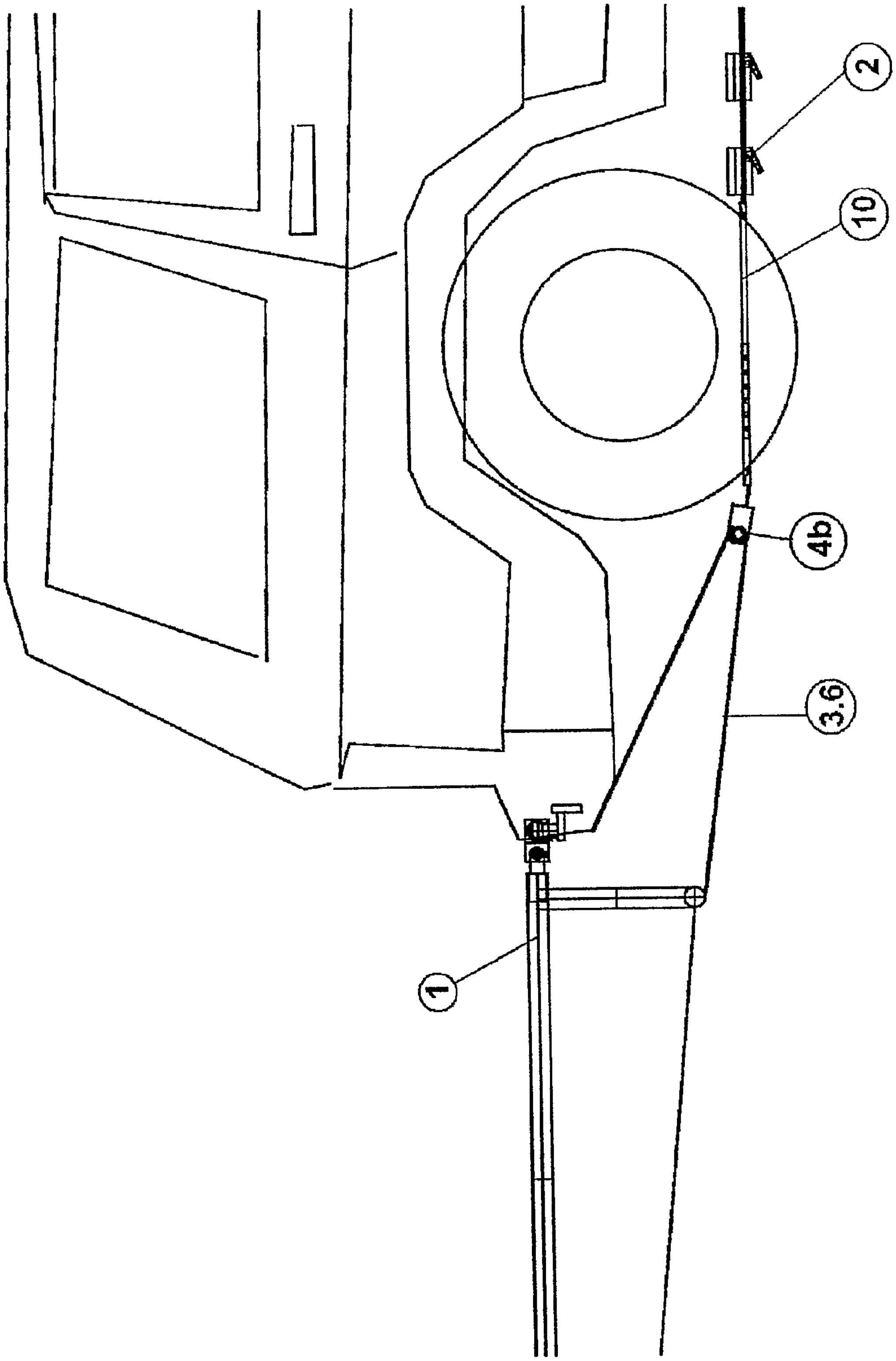

FIG. 9 represents a bar with idler pulleys fixed on the connection system according to the eighth arrangement.

Bar (1) blocs blocks (2), adjustable bar connecting system (10), idler pulley (4*b*), straps (1.9) and (3.6).

Figures 10, 11:
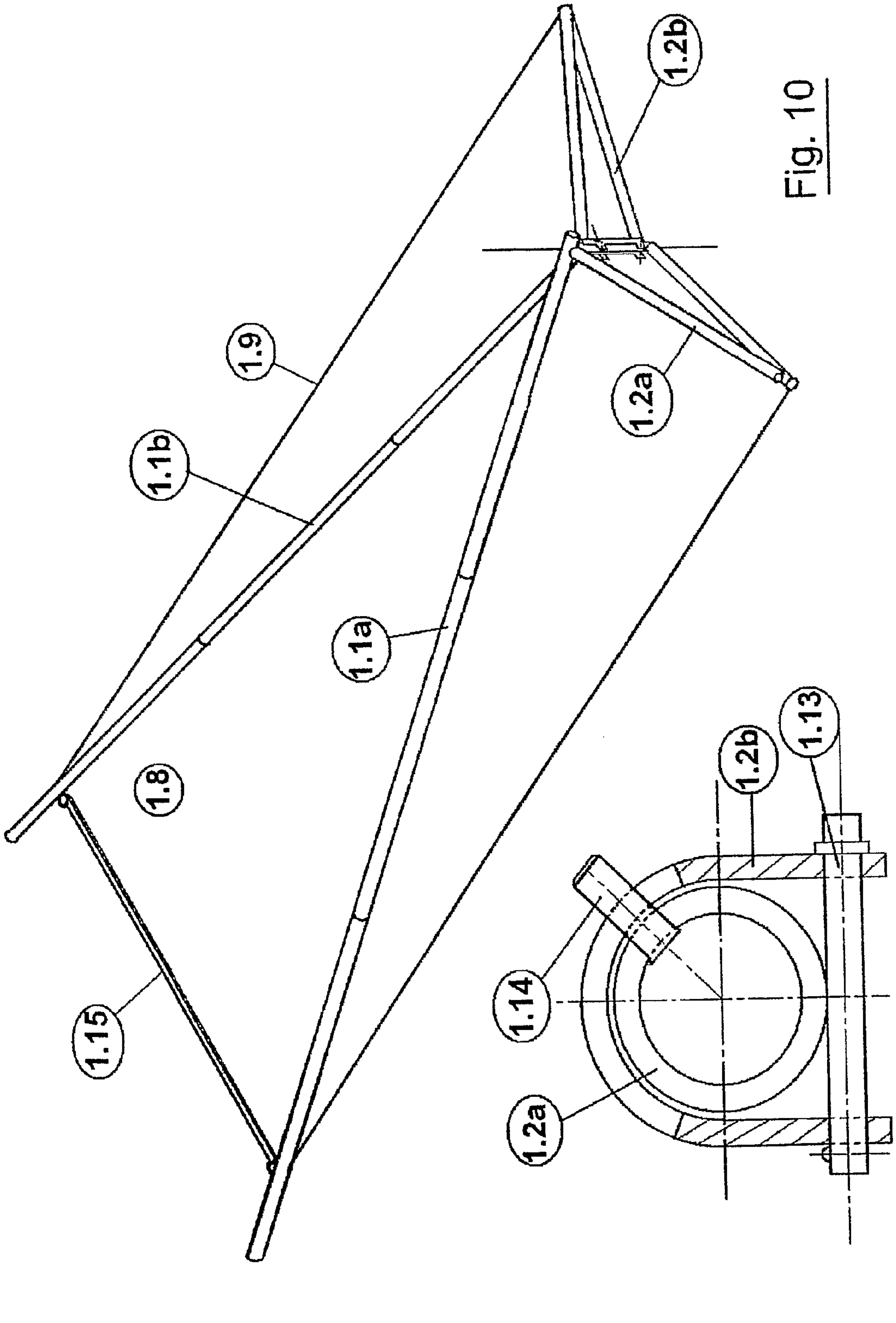

FIGS. 10 and 11, represent a double bar according to the ninth arrangement.

FIG. 10 shows the upper half bar (1.1*a*) with its half triangle (1.2*a*) and the lower half bar (1.1*b*) with its half triangle (1.2*b*), connecting rings between the two half bars (1.8) and set of straps and buckles (1.15).

FIG. 11 shows a detailed drawing of the triangle pivot: axle (1.2*a*) located inside the other triangle hub (1.2*b*), two enclosing pins (1.13), one vertical thrust pin (1.14).

Figure 12:
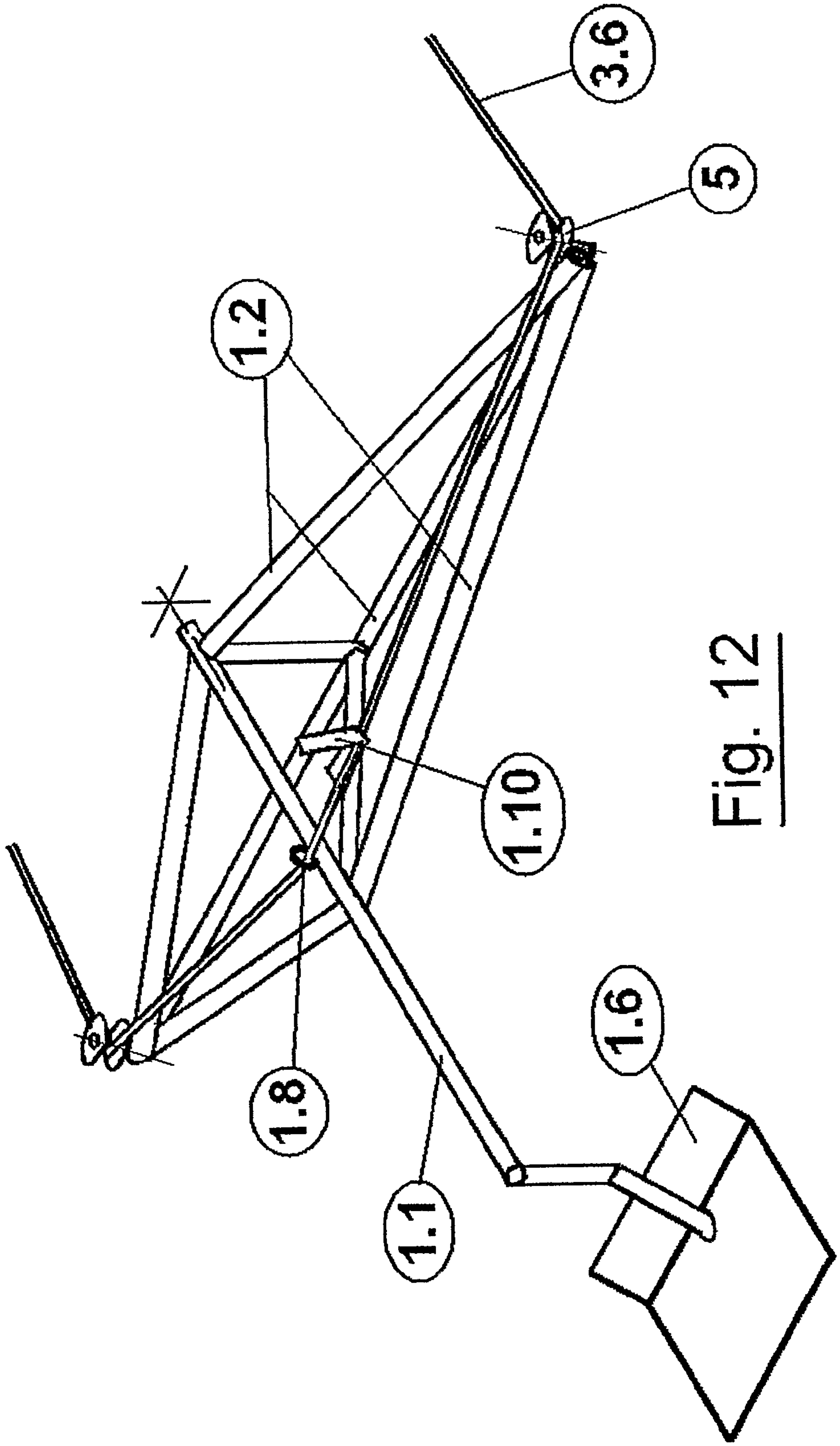

FIG. 12 represents a short bar with idler pulleys fixed at the triangle ends according to the tenth arrangement.

Short bar with elements (1.1), shovel (1.6), ring (1.8), reinforced triangle (1.2), idler pulleys with bearing (5), ratchet tie-down (1.10), straps (1.9) and (3.6).

Figure 13:
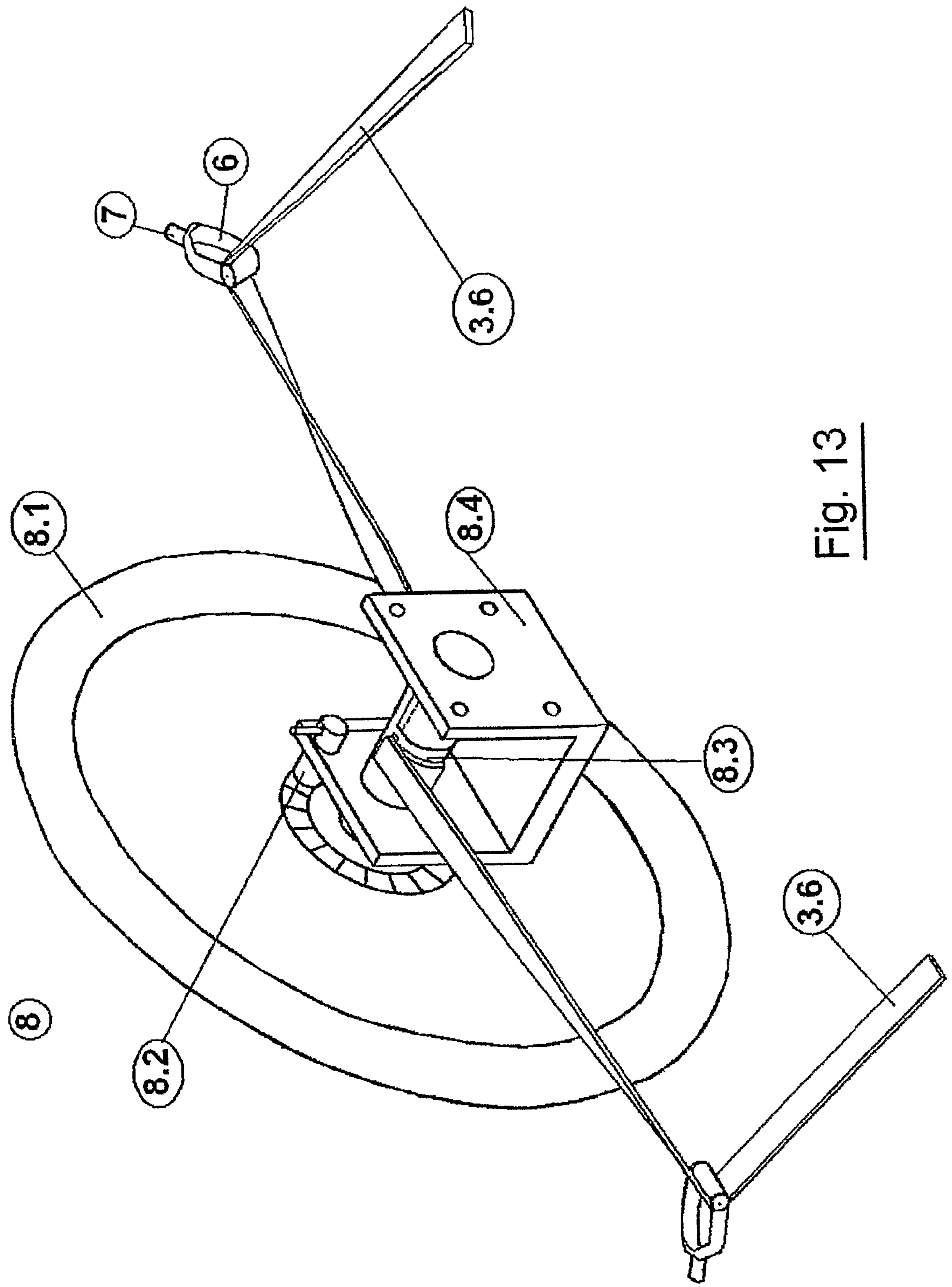

FIG. 13 represents a system with permanent rings according to the eleventh arrangement. Rings (6), connecting pivot of permanent rings (7) to the vehicle structure, double wind winch (8) with winch wheel (8.1), non return system (8.2), winch drum (8.3) with strap holding slots, base plate (8.4) on the vehicle, straps (3.6).

Figure 14:
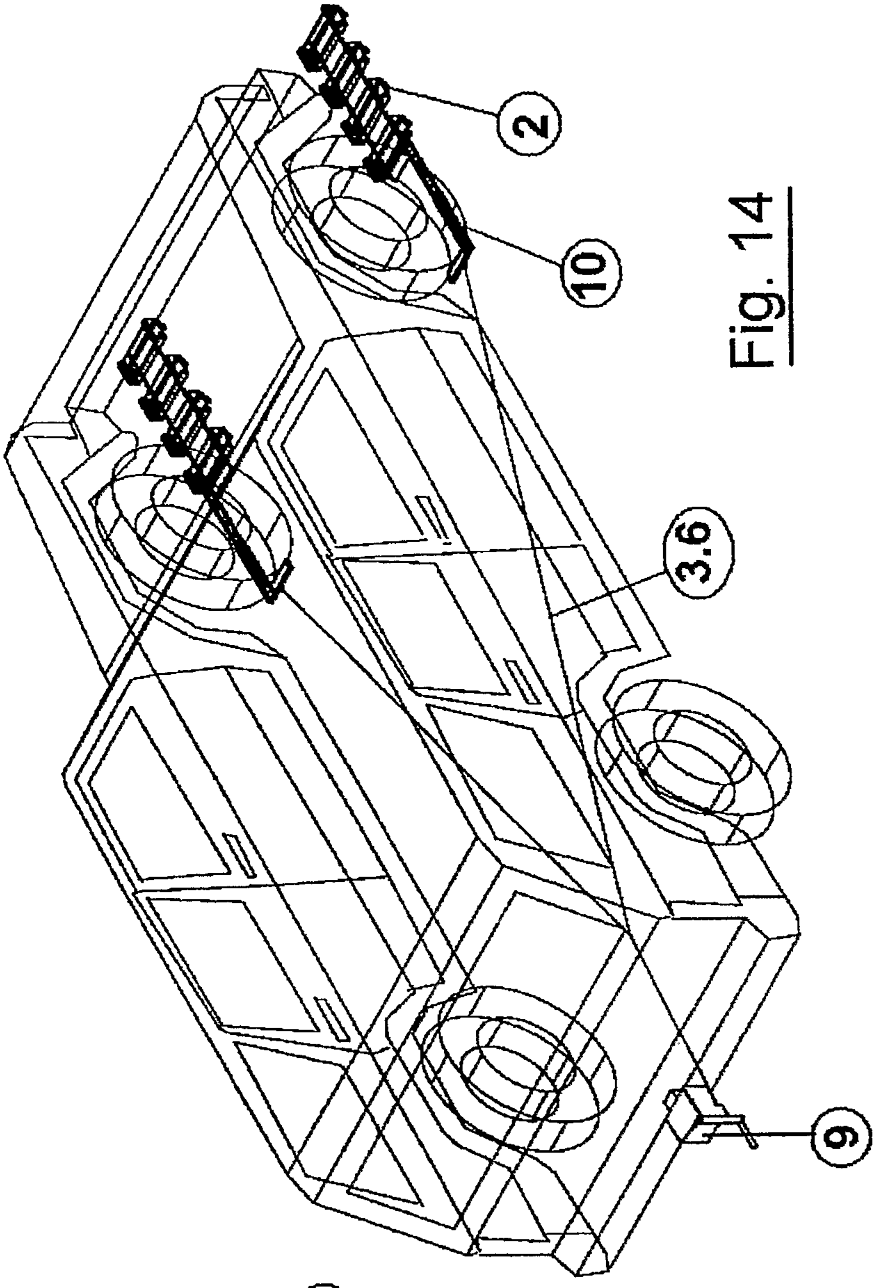
Figure 15:
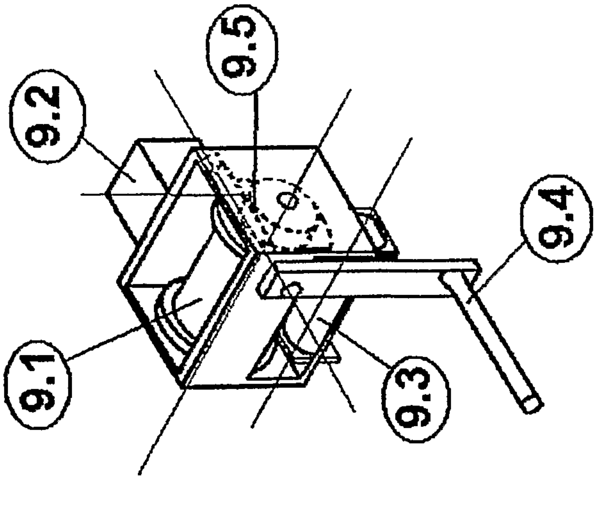

FIG. 14 and FIG. 15 represent a system with winch according to the twelfth arrangement. Pads (2), linkage system to the blocs (10), straps (3.6), winch (9) with its drum (9.1), fixing system to the vehicle (9.2), wheel for cable change of direction (9.3), crank (9.4) and transmission system (for example worm system) (9.5).

Figure 16:
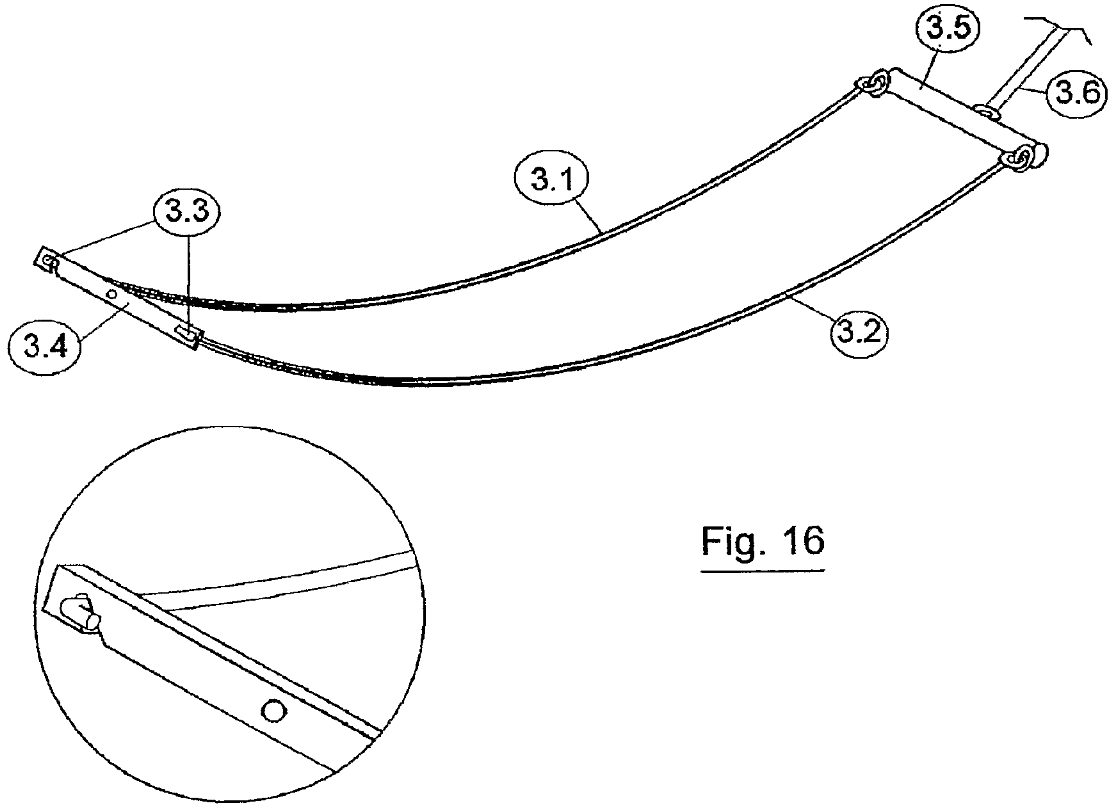
Figure 17:
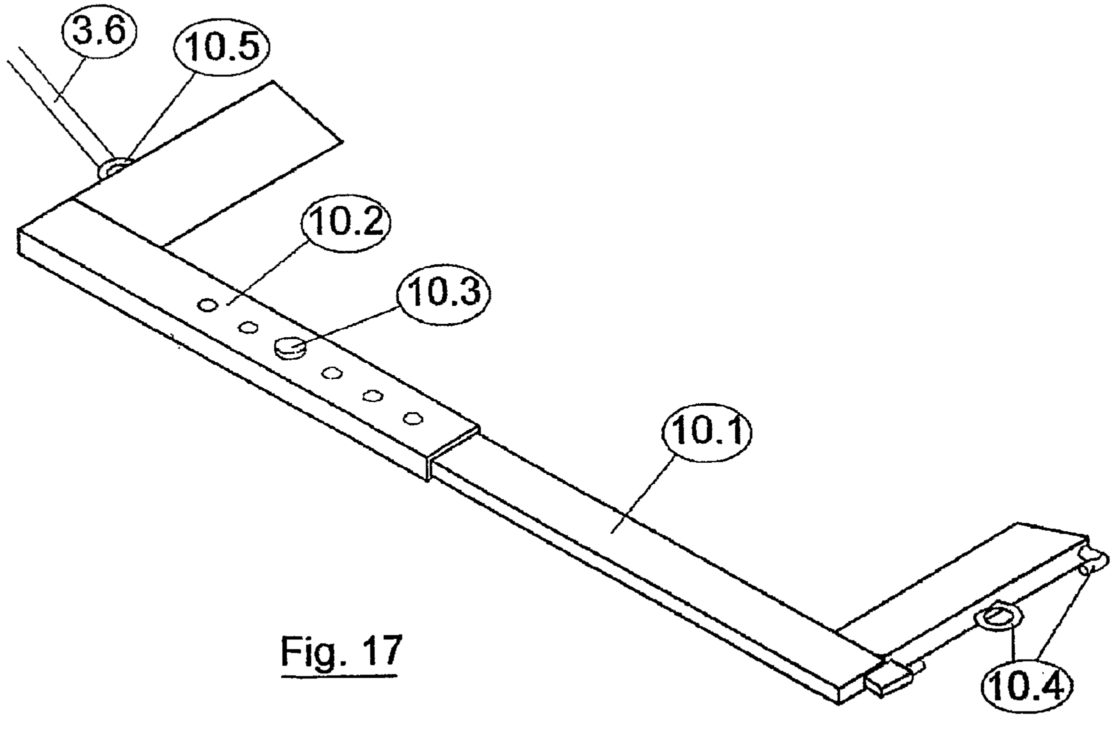

FIGS. 16 and 17 represent two different connecting systems according to the first and thirteenth arrangements.

FIG. 16 shows an arched rods system with inside rod (3.1) and outside rod (3.2), spigots or linking system to the blocks (3.3), small bar (3.4), connecting spreader to the strap (3.5).

FIG. 17 shows an adjustable bar connecting system (10), with rear edged part (10.1) and ring or linking spigot to the blocks (10.4), front edged part (10.2) and linking ring to the strap (10.5), adjustment pin (10.3).

(10.5): linking ring to the strap.

Figure 18:
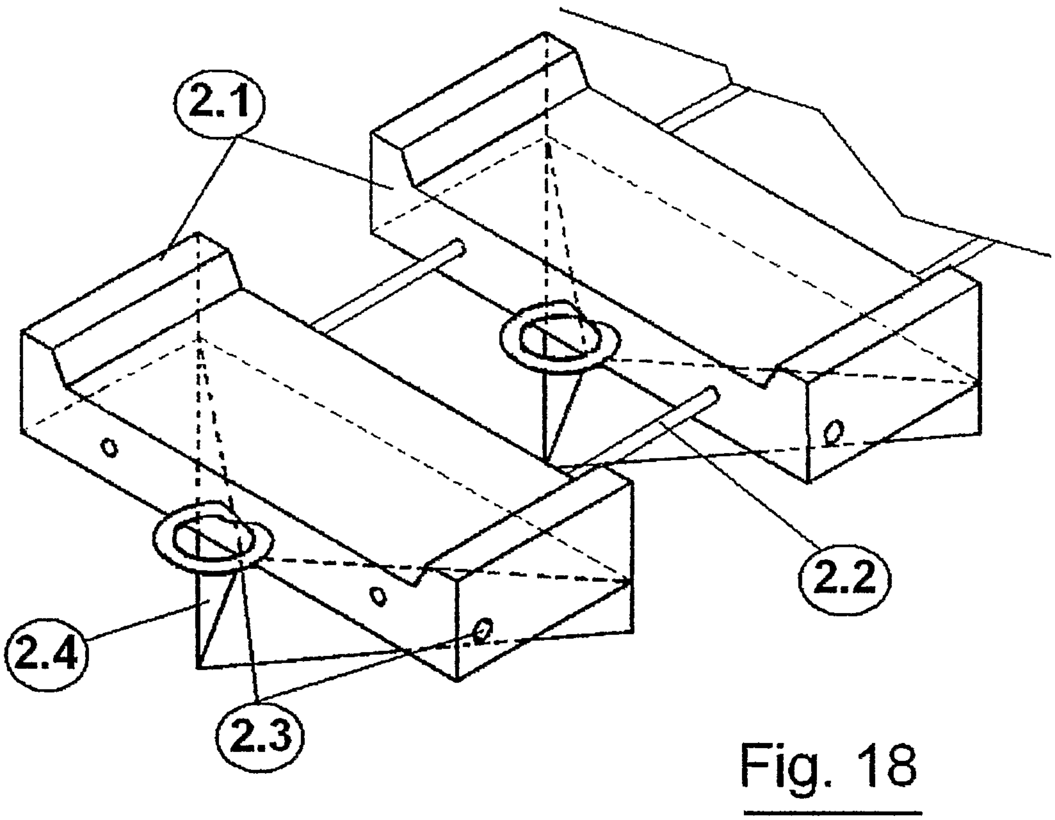
Figure 19:
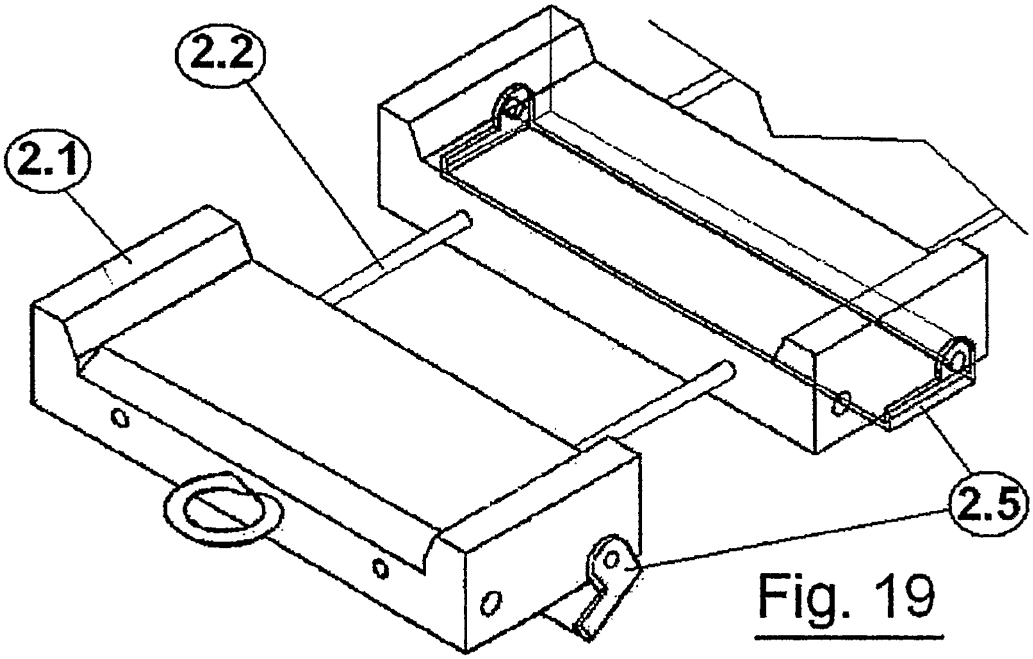

FIGS. 18 and 19 represent two connecting systems to the blocks according to the fourteenth arrangement.

FIG. 18 shows a chain of blocks with blocks (2.1), connecting elements (2.2), hooking device in the form of ring or linking spigots to the connecting part (2.3), fix ploughshare (2.4).

FIG. 19 shows a blocks system with blocks (2.1), connecting elements (2.2), hooking device (2.3) pivoting ploughshare (2.5). The first block ploughshare is shown in open position, the second one is not.

Figure 20:
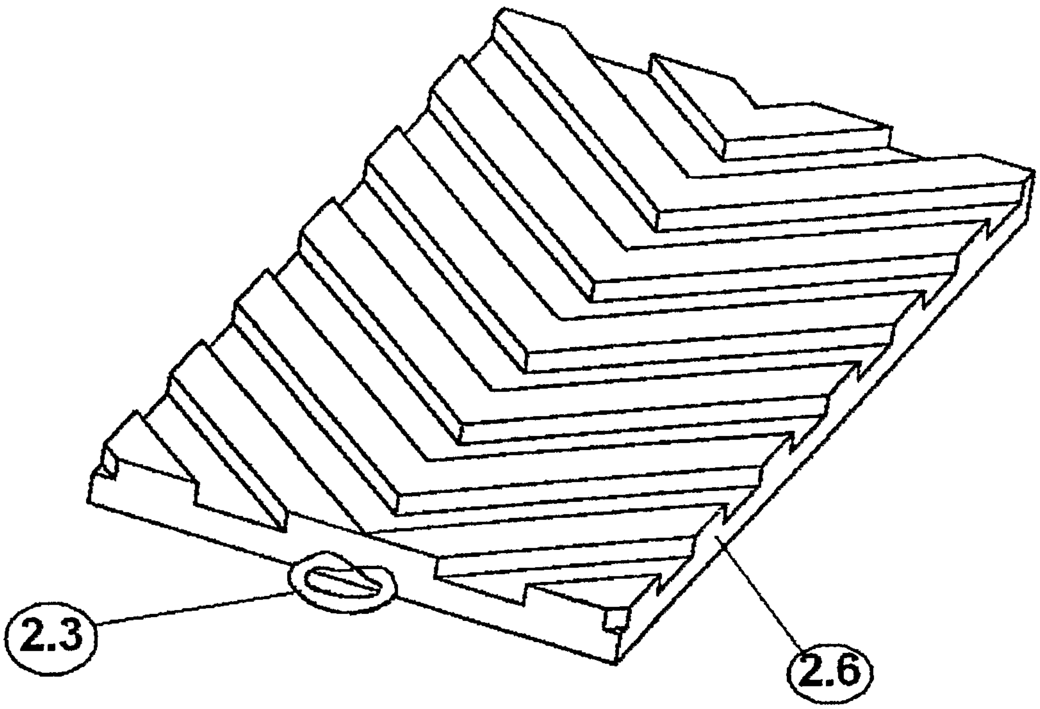

FIG. 20, represents an anti-skid (pad) system according to the fifteenth arrangement. Rubber strip (2.6) seen from underneath, with a ring (2.3).

Figure 21:
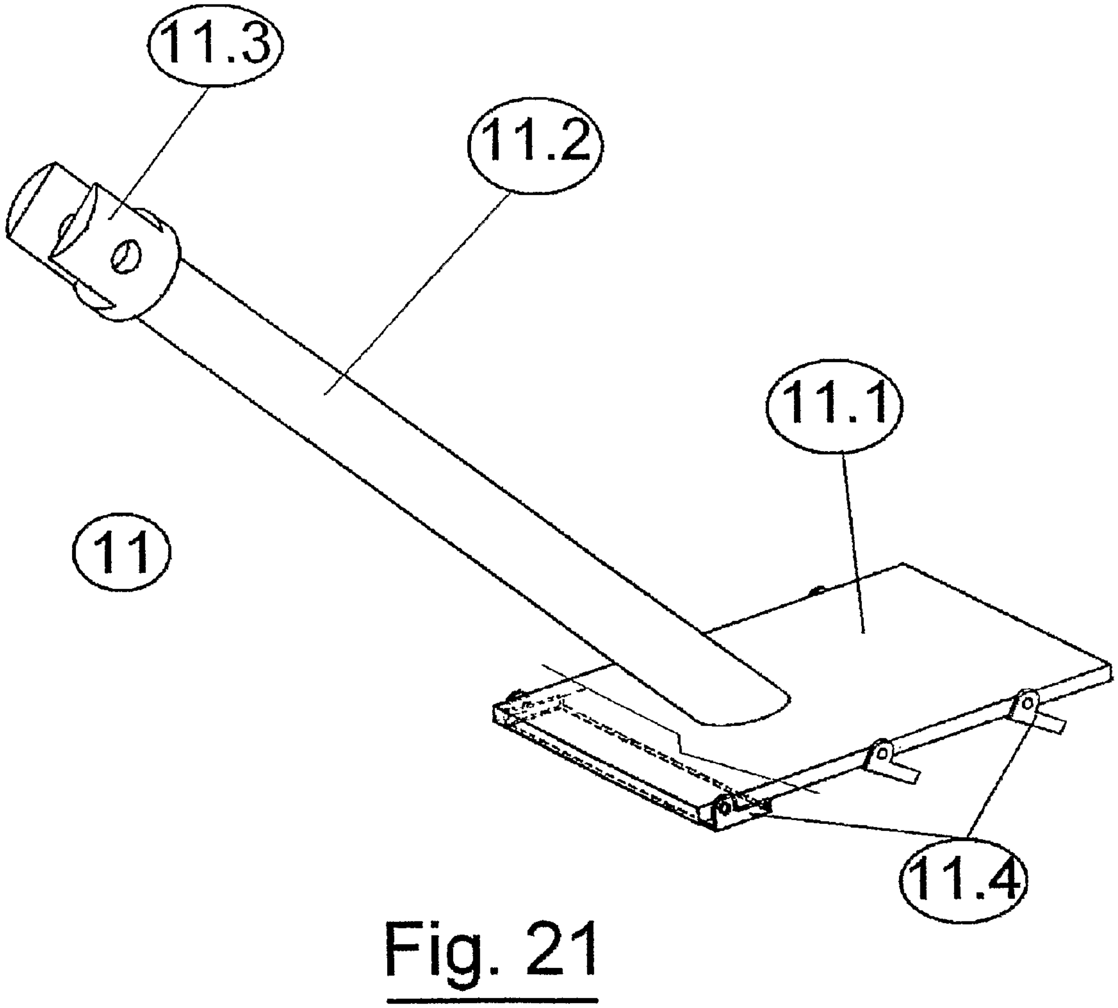

FIG. 21 represents a non return system according to the sixteenth arrangement. Non return system (11) with base plate (11.1), lever (11.2), free to rotate connecting part to the vehicle structure (11.3), ploughshares (11.4) shown in open and close position.

Figure 22:
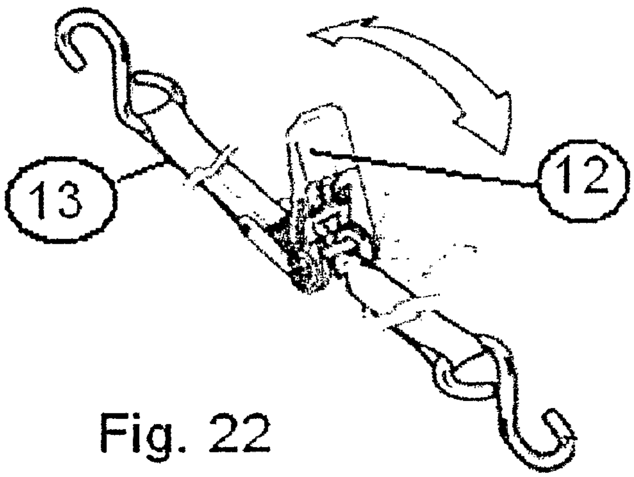
Figure 23:
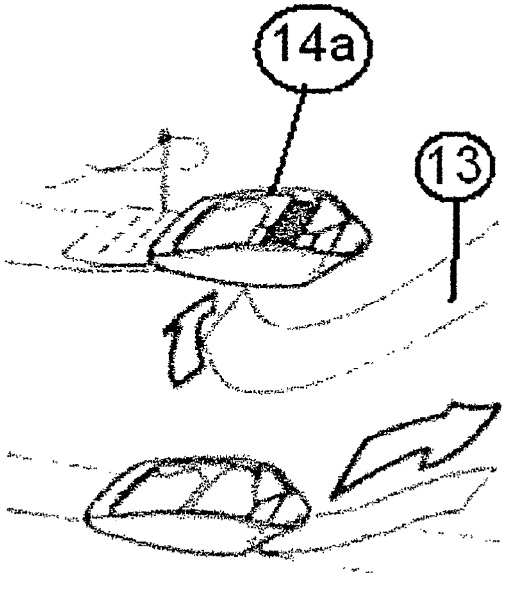

FIGS. 22 and 23 represent different types of tighteners and straps with standard locking buckles according to the previous arrangements.

FIG. 22 shows a ratchet tie-down (12) for loads from 500 to 3500 daN according to size.

FIG. 23 shows a type of tie-down strap (13) with cam buckle (14*a*).

Figure 24:
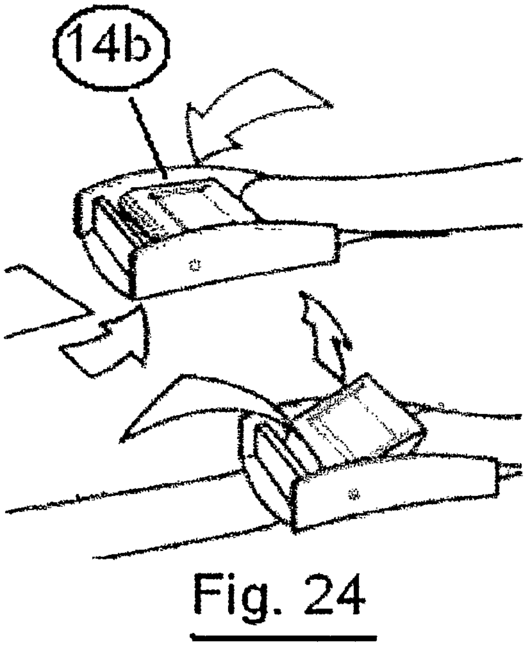

FIG. 24 shows a type of tie-down strap (13) with another self locking cam buckle (14*b*).

Figure 25:
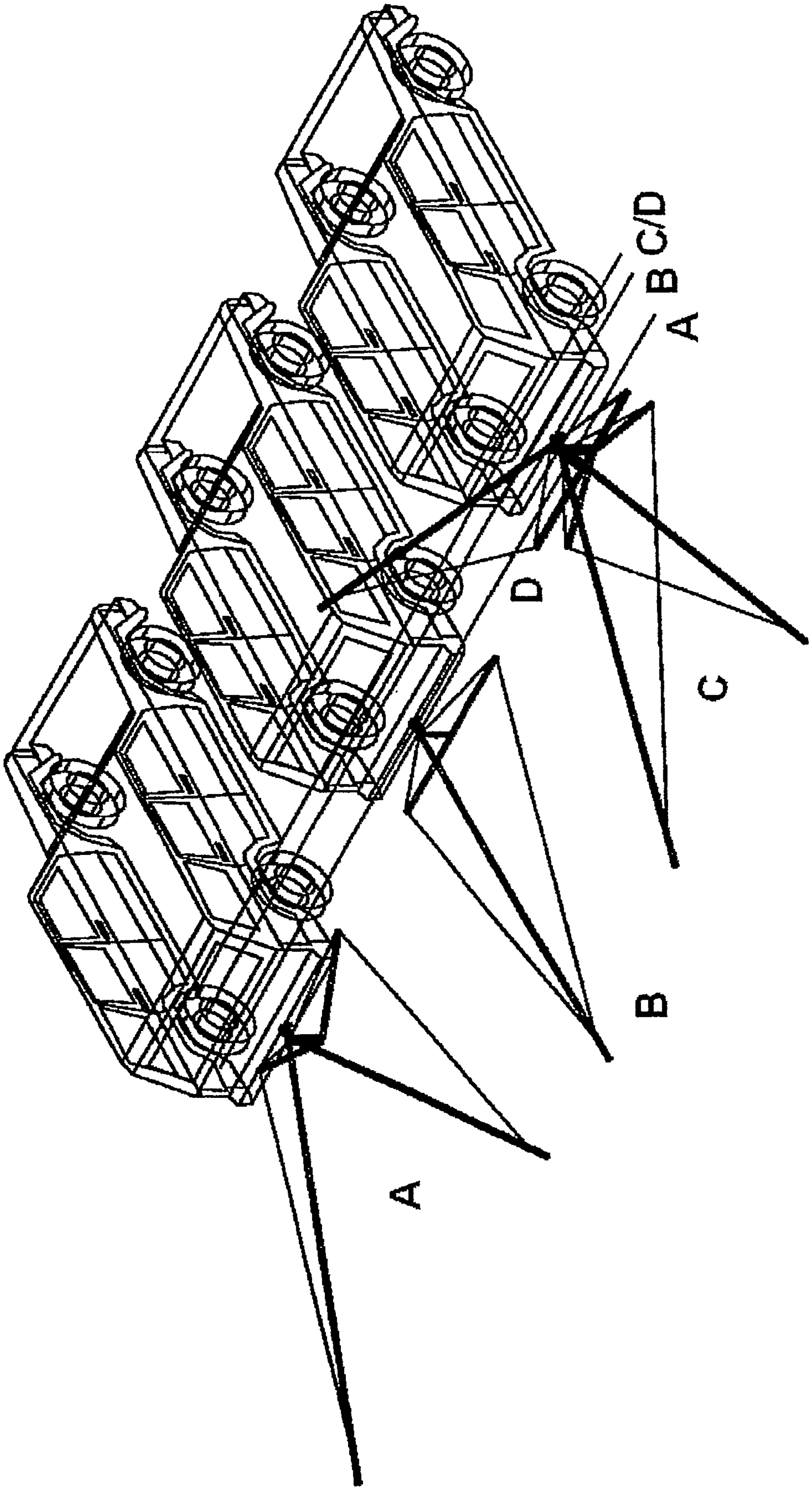

FIG. 25 shows the different phases of the pushing action using the double bar according to the ninth arrangement.

VEHICLE POSITIONS ARE ILLUSTRATED BY VIEWS A, B, C AND D

A: starting point, the half bars are apart, the car rear wheels are on line A

B: middle position, the half bars are brought together, the car rear wheels are on line B, 0.5 m further from line A.

C: final position when bars are crossed, car rear wheels are on line C, 0.8 m further from line A.

D: final position when bars are lifted, car rear wheels are on line D, 0.8 m further from line A.

With reference to these drawings, the system includes the following list of items (1): push Bar.

(1*a*) and (1*b*): upper and lower halves of the double bar.

(1.1): elements of the main beam of the bar.

(1.2): triangle of the bar.

(1.2*a*) and (1.2*b*): outer and inner half triangles of the double bar.

(1.3): connecting pins for the different bar elements.

(1.4): fixing assembly to the vehicle.

(1.4*a*): fixing point of the swivel end of the push bar to the coupling ball of the vehicle.

(1.4*b*): main rear bumper assembly.

(1.4.1): flat end of the bar.

(1.4.2): connecting pin.

(1.4.3*a*): safety pin.

(1.4.3*b*): connecting system.

(1.5): handles.

(1.6): shovel.

(1.7): triangle end rings.

(1.8): ring.

(1.9): bar straps or cables.

(1.10): winch ratchet tie-down or other compact type.

(1.11): triangle pivot with axle.

(1.12): triangle guide bar.

(1.12*a*): one way pin.

(1.12*b*): two way pin.

(1.13): enclosing pins (1.14): vertical thrust pin.

(1.15): linking straps.

(2): chain of blocks (or anti-skid blocks).

(2.1): blocks (2.2): blocks connecting elements.

(2.3): hooking device to attach the connecting system.

(2.4): fix ploughshare.

(2.5): pivoting ploughshare.

(2.6): rubber strip (blocks variant).

(3): rods connecting system.

(3.1): inside rod.

(3.2): outside rod.

(3.3): spigot or linking system to the blocks.

(3.4): small bar.

(3.5): connecting spreader to the strap.

(3.6): straps (between connecting system and triangle).

(4*a*): idler pulley triangle side).

(4*b*): idler pulley on connecting system side).

(5):): idler pulley with bearing (fixed at triangle end).

(6): permanent rings (vehicle rear structure)

(7): connecting pivot of permanent rings.

(8): double wind winch.

(8.1): winch wheel.

(8.2): non return system (of the winch).

(8.3): winch drum (with straps holding slots).

(8.4): winch base plate.

(9): winch.

(9.1): winch drum.

(9.2): winch fixing system to the vehicle.

(9.3): roller for cable change of direction.

(9.4): winch crank.

(9.5): winch transmission system.

(10): adjustable bar connecting system.

(10.1): rear edged part of the adjustable bar.

(10.2): front edged part of the adjustable bar.

(10.3): pin.

(10.4): ring or linking spigot to the blocks.

(10.5): linking ring to the strap.

(11): vehicle non return system.

(11.1): non return system base plate.

(11.2): non return system lever.

(11.3): free to rotate connecting part to the vehicle structure (11.4): ploughshare.

(12): ratchet tie-down (13): tie-down or stowing straps.

(14*a*): self locking cam buckle.

(14*b*): other type of self locking cam buckle.

BEST MODE FOR CARRYING OUT THE INVENTION

According to a first arrangement, the invention consists of a set of elements positioned around the vehicle and used in the standard procedure described underneath: A push bar (1) with its components:

bar elements (1.1), the triangular part called the triangle (1.2), pins connecting the various bar components (1.3), a connecting system to the car bumper or to the trailer coupling system (1.4), handles (1.5), a shovel (1.6), a set of straps and buckles (1.9) that can be of a standard tie-down type (13 and 14*a* or 14*b*), four sets of chains of anti-skid or supporting blocks (2) that will each form an anchoring point and a supporting track for the vehicle;

four sets of connecting systems between the push bar and the chains of blocks, each comprising: two rods (3.1 et 3.2), with spigot (3.3) and a small connecting bar (3.4) on the blocks side and a spreader (3.5) on the other side to connect the rods to the straps (FIG. 16);

four sets of stowing straps (3.6) with self locking buckles that can be of standard type (13, 14*a* or 14*b*), and hooks.

The system is designed to be easily and quickly operated and to be easily stored in the vehicle trunk. It is of adequate dimensions and weight. For that purpose, the bar structures will work as much as possible under direct compression and will have such shapes as to avoid buckling and bending.

The straps work under traction conditions and the triangles and other bracings optimize the design to take advantage of these combinations.

Standard Procedure for Setting and Using the Push Bar

General. The principle consists in the use of:

anchoring points created by the blocks loaded and anchored into the ground by the weight of the vehicle, a special push bar acting as a lever, and the strength of men.

Once anchored into the ground, the blocks will virtually no longer move. The system leverage will vary within a range of 10/1 to 2/1, creating for each operation a vehicle movement of between 0.2 and 1.0 meter. The differences come from the different possible arrangements and types of push bars that are in fact chosen according to the vehicle weight, number of men available and the depth in the sand of the stuck vehicle.

The procedure is described for a four-wheeled vehicle and for the standard push bar configuration.

Positioning of the System

The operator deploys on both sides of the vehicle and just ahead of the front and rear wheels a chain of blocks that are connected to each other by the blocks connecting elements (2.2). The 4 chains of blocks (2) are straight, in wheels axis and their concave face is on top. The 2 arched rods (3.1 and 3.2) of each connecting system (3) will be positioned behind each wheel and the extremity of the inside rod (3.1) will be dug into the sand to reach the front side of the wheel. Then its spigot (3.3) will be hooked to the inside hole of the first block (2.1) as the outside rod (3.2) is laid along the outside face of the same wheel and its spigot is in turn hooked to the outside hole of the first block. Finally both rods and spigots are secured by the small bar (3.4). The arched shape of the inside rod helps to reach the front of the wheel by going underneath the sunk parts of the wheel axle and popping up through the sand on the other side.

Once the 4 chains of blocks are connected to the connecting systems (3), the operator checks that the first blocks are in line with their wheel, fastens the straps (3.6) to the connecting spreader (3.5) ring and leads the straps free extremities to the rear of the vehicle (alternately, the front wheel strap is attached to the back front end of the rear wheel chain of blocks in the serial arrangement of the system). These straps extremities will later go through the triangle end rings (1.7) or be attached to the rings or to the straps (1.9) going through these rings.

The bar is deployed behind the car and in its main axis. The bar length is in general around 3 m, but can vary from case to case. All bar components have been previously put together: main bar elements (1.1), triangle (1.2), shovel (1.6), handles (1.5) and other pins (1.3), bracings and straps (1.9). The bar front extremity is assembled to the rear car bumper or to the trailer coupling system by its fixing assembly to the vehicle (1.4). The type of assembly allows some free rotation in both horizontal and vertical planes.

Pushing phase. Once the system is set, the lifting of the bar at handles (1.5) level will induce a relative movement of the vehicle onto the 4 chains of blocks which will then act as anchoring points (or fulcrum) for this "lever" system. Lifting the bar 1 m will induce a car movement of around 0.1 m, it may be necessary to repeat the action several times taking precautions to keep the straps under tension and prevent the car from going back into the holes by filling them, having someone using the car brakes or using a non return system. Instead of lifting upwards, one can also rotate the bar in the horizontal plane and use the pulling action of one long side of the triangle on the same side of connecting straps. In this case, the movement to force ratio is increased and the pushing force is reduced.

Once the vehicle is free, the operator disconnects the bar elements and stores them in the trunk.

Detailed description of the bar: the push bar (1) is made of light elements (1.1) such as hollow pipes of individual length of 1 m, diameter and wall thickness of around 50 and 5 mm. These dimensions are only approximate and vary according to the construction materials which are generally steel, aluminum, even glass or carbon fiber, according to the push forces to generate and of the actual bar arrangement used. The elements ends are fit together in order to form the bar and are secured by pins (1.3) introduced into the adequate holes. The gap between inside and outside diameters is reduced in order to avoid buckling effects. The front end of the bar is made of a flat piece (1.4.1) with a horizontal hole. This shape and the associated pin (1.4.2) are designed to connect the bar to the fixing assembly to the vehicle being in turn mounted on the trailer coupling device of the car or the rear bumper assembly (1.4, 1.4*a* or 1.4*b*). The hole and pin (1.4.2) of the flat piece allow free vertical rotation of the bar, as well as some free movement in the horizontal plane by use of short guide length and big construction gaps. The pin has a locking system.

The triangle (1.2) is also located at this side of the bar. The triangular shape is designed to allow the transmission of pulling forces away from the bar main axis and the different bracings avoid collapsing of the assembly under such forces.

In the standard arrangement, the triangle is located in a plane perpendicular to the bar axis and its total width is around 1.5 m. The triangle end rings (1.7) are then located slightly on the outside of the wheels plane and at a level around 0.3 m underneath the level of the bar when the bar is connected to the car bumper in horizontal position.

The intersection points of the bar and triangle elements are either made by special parts into which the elements ends are fitted or by pin or bolt assembly of these element ends.

The fixing assembly (1.4, 1.4*a* or 1.4*b*) to the bumper or the trailer coupling ball of the vehicle transmits the pushing force of the bar to the vehicle. It also transmits forces in other directions, in particular downwards. According to the trailer coupling shape and to the space available around it, it is possible to assemble the bar directly by means of a swivel coupling. In most cases an intermediate part is required. If the vehicle is not previously equipped with a trailer coupling ball or system, the main rear bumper assembly will cover the bumper and will form a rigid structure that will spread the push force evenly over a great surface to avoid punching effects. If the bumper is not strong enough, this assembly will be extended to the car chassis. The assembly will be secured onto the bumper with easy to use fasteners (**1.4.3*b***).

On the operator side, the bar can have lifting handles (1.5) made of a piece of pipe around 400 mm long and 25 mm in diameter. They go through the main bar element and ease the lifting process for two operators.

The shovel (1.6) has a runner shaped surface on which the bar can rest without touching the ground or slide easily when the system moves forward.

The straps transmit the pulling forces of the bar to the blocks. They are made of materials that are as little elastic as possible to avoid accumulation of energy and associated risks for the operator and to maintain a direct and instantaneous conversion of the lifting movement into the car translation movement. For the standard assembly, the set of straps linking the chains of blocks to the back end of the bar can be attached or not to the triangle end rings (1.7). When they are not attached, the triangle must have bracings with a component in the direction of the bar main axis (that is to say with a triangular shape in a plane view). These straps ends are equipped with self locking buckles (**14*a* or 14*b*) that allow the adjustment of the length, the of the slack or the fastening of straps together. Their friction against the rings will be minimal and their flexibility as good as possible. They are made of synthetic woven material for the stowing strap type (13**) or high tensile strength steel for the cable type. The forces exerted on theses straps or cables vary according to the arrangements and the vehicle characteristics in a range of 500 to 2000 daN.

Detailed Description of the Chains of Blocks (FIGS. 18 and 19)

The blocks (2.1) have "U" shape with the dimension of the width slightly wider than the tire. They are connected to one another by means of blocks connecting elements (2.2) to form a chain. These connecting elements are flexible, of cable, chain, strap or other type and allow for freedom so that the blocks can be stored and manipulated easily and can copy the track profile as well as transmit the pulling forces.

The pulling force can be limited to the traction of one chain of blocks or can correspond to the force of two chains of blocks for the serial arrangement, that is to say for the arrangement where the front wheel connecting element is attached to the rear wheel chain of blocks.

The quantity of blocks included in each chain is such that when deployed, they provide a supporting track long enough to guide the vehicle until it is totally free. The standard number varies from 4 to 8 blocks. The individual block length, width and thickness are such that they allow good support on the ground and under the vehicle wheel while sinking deep enough under the vehicle weigh to become a good anchoring point. They also form a thick track that lifts up the car a little bit and can avoid contact of the lower part of the car with the ground.

The "U" wings guide the tire or align the blocks with the tire. For some arrangements, the anchoring capacity of the blocks can be improved (see FIGS. 18 and 19). The blocks are made of light material such as plastic, light alloys, wood, hollow steel profiles, hollow alloy castings.

Detailed Description of the Connecting System (3) (See FIG. 16)

The inside and outside rods (3.1 and 3.2) are made of spring steel. Their length is around 1 m and diameter of around 5 mm. They are slightly arched and have good pulling capacity, are easy to store and are easy to install during maneuvers around the stuck wheel (from back of the tire to front and going under the wheel axle). On the blocks side they each have a hooked end or spigot (3.3) which with a small removable connecting bar, form the connecting system linkage to the first block. On the other side, the end ring of each rod is attached to a spreader (3.5) that insures the connection of the rods to the straps.

According to a second arrangement, the push bar elements are made of tubular profiles that can fit inside one another for reduced storage volume. For instance, during storage phase, the elements at the operator's end will be of smaller diameter and can be put inside the center elements which in turn can be put inside the elements of the car side and can also accommodate the triangle tubular elements. For operating phase, the connection between all these different diameter elements is made by screw or pin systems. This arrangement also allows the use of bigger diameters where they are needed to avoid buckling, and without increasing the storage volume.

According to a third arrangement, the triangle will be tilted forward in order to increase the movement of the car for the same lift of the bar. With the standard arrangement, when the bar is lifted to an angle over 30 degrees, the rotation of the triangle end rings produces a smaller displacement for each additional lift. With the third arrangement, the reduction of displacement is lessened.

According to a fourth arrangement, a ring (1.8) will be fitted to the bar near the handles to possibly connect the bar to the top of the vehicle. The strap connecting the ring to the roof will form a close loop with its length adjusted by a locking buckle (1.15). The purpose of this arrangement is to maintain the lifted position of the bar by tightening this loop and therefore preventing the car from going back into the hole.

It is also possible to pull on this strap in order to lift the bar. Due to the fact that the strap is doubled when forming the loop but acts only up to the ring level, the pulling effort of the operator is more or less equivalent to the pulling effort that is normally exerpted by the operator on the bar. However, with this arrangement, the bar works more under bending condition.

If the fix point on the top of the car is replaced by a point on each side of the front bumper, it is also possible to pull the straps from these points and lift the bar to vertical position.

According to a fifth arrangement, the triangle is reinforced and the straps or cables simply slide inside the triangle end rings. It is then possible to create the pulling on the straps and the car movement by action on a tie-down or on a winch (1.10) located at the back end of the bar. The bar will remain in horizontal position and will slide on its shovel (1.6). This arrangement allows for safe pushing of heavy vehicles. Here, the bar is used only as a means to locate the pulling device far behind the rear wheels, to have the direction of the pulling forces almost parallel to the movement and to transfer the only important efforts to the vehicle on its trailer coupling ball. One can use the manual winches from around 500 daN to 3500 daN or electrical winches. The use of winches can also be combined (but not simultaneously) to a lifting of the bar. The bar length can be reduced in that case (2 to 3 m).

According to a sixth arrangement, the triangle can pivot inside a vertical guide (1.11) located next to the front side of the bar, immediately under the main bar element, and the straps (3.6) are attached to the triangle end rings. The straps (3.6) coming from the front wheels can be attached to the straps (3.6) coming from the rear wheels to the same triangle end ring, then minimizing the different forces applied on the triangle, or can be attached to another triangle ring located near the end ring if the front wheel straps come from the inside underneath the car. In that case, the straps going to the winch are attached to a new ring located in between the two previous ones. The triangle acts only as a spreader that keeps the distances between straps on each side of the vehicle.

It is then the action on the tie-down or winch (1.10) located at the back end of the bar that induces the car movement. The free rotation of the triangle allows for a displacement of around 400 to 500 mm for an angular displacement between position 45 degrees forward and 90 degrees backwards. The arrangement also allows the standard use of the bar for a triangle position between around −45 and +45 degrees. In order to optimize the displacement and to adjust the height of the triangle, there is a system that guarantees a minimum height without limiting it and even letting the triangle to free itself from the guide (1.12). This is obtained by inserting the pin (1.12*a*) at the top of the central guide when pin (1.12*b*) is not inserted. During the pushing operation, the bar will slide on its shovel (1.6).

This arrangement provides a long displacement and a secure push of a light or heavy vehicle by only one operator. Again, the bar transfers the traction point far behind the car wheels in order to get forces in a direction parallel to the wheels plane and transfers strong forces to the car bumper or trailer coupling device. Manual winches from 500 daN to 3500 daN or electrical winches can be used.

To operate the bar in its lifting configuration, it is necessary to insert the pin (1.12*b*) in the only hole of the central tube of the pivot and in one of the tubular guide (1.12) holes. This tubular part is therefore drilled with holes for pins (1.12*a* and 1.12*b*) at intervals and in two perpendicular directions.

According to a seventh arrangement (FIG. 8), the straps coming from the car wheels on each side will go around the wheel of an idler pulley (4*a*) which is attached to the end ring of the triangle, then their free end will be fastened to a fix point on the vehicle structure (jack lifting point or hook on the chassis . . . ). Going through the idler pulley will practically double the car movement for the same bar lift as in the standard arrangement, and will practically reduce by half the pushing force for the same effort on the bar. The idler pulley can be replaced by a small roller free to rotate in an elongated triangle end ring or even by the ring itself if the straps and ring materials and surface have reduced friction.

According to an eighth arrangement (FIG. 9), the idler pulley (4*b*) is located at the connecting system (3) spreader (3.5). One end of the straps (3.6) is fastened to the triangle end rings while the loose end goes through the pulley wheel and is fastened to a fix point of the car. Going through the idler pulley will practically reduce by half the car movement and double the pushing force as compared to the standard arrangement. Similarly, the pulley can be replaced by a roller or even by the ring itself.

According to a ninth arrangement, the bar is divided into two halves (1.1*a* and 1.1*b*), (FIGS. 10 and 11). The two halves are free to rotate in a horizontal plane around an axis located at the triangle level. Their respective back ends are provided with a ring (1.8), and a strap with self locking buckle (1.15) forms a loop that joins these two rings.

One half bar (1.1*b*) is located slightly underneath the other one (1.1*a*), the horizontal element of its half triangle (1.2*b*) is located slightly above the horizontal element of the half triangle of the other half bar, and its vertical element is open with a slightly bigger dimension than the other half triangle vertical element, so that the smaller diameter can fit inside the bigger one and rotate freely as soon as the open shape is closed by enclosing pins (1.13) or bearings. A vertical thrust is also added to this vertical element to stop any relative axial displacement.

This arrangement provides a big displacement of the vehicle. The starting position is a position where the two halves are horizontal and spread apart, then joining the two halves by rotating them towards the middle axis. During the phases of horizontal rotation of the half bars, the leverage is according to the ratio of half bar length to half triangle horizontal part length. Displacement of the vehicle and the pushing forces also vary accordingly. The loop made around the rings (1.18) by the strap fitted with the self locking buckle (1.15) is used to secure the tight position of the two half bars or to get the halves closer to one another by pulling on the loose end of the strap.

It is also possible to use the ring (1.18) and the rings at the top of the car or at front bumper level as explained in the fourth arrangement.

The loop also allows the operation by only one operator when two are normally required When the two halves are close together and fastened, it is possible to increase the displacement of the car by lifting the joined bars as for a standard bar, or if the halves are not fastened, by continuing the horizontal movement of the halves that are then crossed beyond the central axis.

Lifting the bars gives more pushing force and crossing the bars optimizes the displacement. It will therefore be possible to fasten the half bars in their position with the loop and lift them instead of continuing crossing them when the resisting effort increases. Crossing the half bars will lead to an interference zone between one half bar and the other half bar's straps so that it is not possible to have the same displacement in this phase than within the previous one.

According to a tenth arrangement, the push bar is shortened in significantly and is basically transformed into a triangle with idler pulleys (5) at its ends (FIG. 12). The pulley changes the direction of the forces from the direction of the wheel straps (3.6) (parallel to the car axis and slightly upwards) to a direction almost perpendicular to the car axis from the outside to the centre. These actions are symmetrical, and the pulling effort derives from the tightening effect on the straps ends of a tie-down or winch (1.10) similar to the one in the fifth and sixth arrangements. In this arrangement, the small element of the bar itself is only used as a bracing for the triangle structure and the triangle is only a support for the idler pulleys. The bar does not need to be lifted or to rotate freely in relation to the rear of the vehicle. If the trailer coupling device of the car cannot hold the torques generated, this can be managed by using a strap fastened to the fix point at the top (roof) of the car or by the shovel at the end of the short bar. The shovel will slide on the ground in spite of the added load due to the level difference between the bumper and the action on the connecting system (3 or 10).

According to an eleventh arrangement (FIG. 13), the bar and triangle are replaced by two rings (6) (fastened permanently, even during car manufacturing) mounted on a pivot or linkage (7) located at the rear of the vehicle as low as possible underneath the bumper and as aligned as possible with the plane of the wheels. The location is close to the main beams of the chassis, slightly on the outside. The dimension of the ring (6) straight part on which the strap runs is big and smooth in order to reduce the friction between ring and strap. Alternately this part is free to rotate.

In this configuration, a mere tie-down or a winch connected to the loose end of the straps (3.6) coming from the connecting systems (3 or 10) of each side of the vehicle, will produce the pulling effort on the chains of blocks and therefore induce the pushing effort on the car where the forces change direction, at the level of the permanent rings (6).

Normally the displacement of the car is balanced on each side, but with the use of a mere winch (for instance a ratchet type (12)) this is not necessarily the case, and in that case and in order to correct the unbalance it is possible to block one of the straps to the car (trailer coupling) so that only the other strap will create a movement. The blockage can also be done at ring (6) level by introducing a rubber edge (provided near the ring location and fastened to the car body by a small cable) in the ring. This arrangement is best suited for the use of a double wind winch (8) that will automatically balance the displacement on both sides.

According to a twelfth arrangement, the bar and triangle are replaced by a winch (9) fixed on the trailer coupling system and pulling only on the front wheels straps. These straps (3.6) need to go under the vehicle. This is made easier by the use of a thin steel rod similar to the rods (3.1 and 3.2).

According to a thirteenth arrangement, an adjustable bar connecting system (10) that does not need access to the inside face of the wheels, replaces the rods connecting system with arched rods (3.1 et 3.2). It consists of two parts with edged surface, with length equal to the tire width, kept parallel and joined together on their outside end by a length adjustable bar (10.1 and 10.2). The system is positioned on the wheel outer side, the rear edged part being connected by a set of rings or spigots (10.4) to the chain of blocks and the front edged part (10.2) being connected by a linking ring (10.5) to the pulling strap (3.6). The distance between the two edged parts is adjusted by the position of a pin (10.3) in one of the holes drilled in the inner sliding part of the adjustable bar telescopic system and according to the tire size and the depth of the wheel in the track. The adjustable bar and pin are designed to resist the force exerted during the pulling phase.

According to a fourteenth arrangement (FIGS. 18 and 19), some ploughshares are added to the lower face of the blocks to increase the grip on the ground. These ploughshares can be fix (2.4) or articulated.

According to a fifteenth arrangement, the function of the chain of blocks is insured by a thick rubber strip with rough lower surface (2.6).

According to a sixteenth arrangement, a vehicle non return system (11) is added to the set of equipment. It is composed of a base plate (11.1) fixed to a lever (11.2) bottom end, the upper lever end (11.3) is hinged onto a chassis beam at the rear part of the vehicle. During a forward movement of the car, the system will slide on the ground. During a backward movement of the car, the lever pushes on the base plate and stops the movement. Ploughshares (11.4) increase the efficiency of the non return system.

According to a seventeenth arrangement, the types of tie-downs, manual and electrical winches used in the various arrangements can be switched.

That is to say, that each arrangement can be used with one or any other type.

There are many tightening device types. Models (8, 9 and 12) are only a few examples and any other adequate type can be used in place of these within the framework of the invention.

According to a eighteenth arrangement, the push bar systems and all their variations are also suitable for vehicles with a number of wheels that differs from four, whether they are light or not. Sizes mentioned in the text are approximate and for reference and are to be adapted to each situation. Other adequate sizes are included within the framework of the invention.

INDUSTRIAL APPLICABILITY

The invention helps a vehicle get released from a situation where it is stuck in soft track material. On-road vehicles can venture onto tracks that are usually only accessible to specialized vehicles, and specialized vehicles can increase their capacity to deal with obstacles. The invention allows people to enjoy the great outdoors whilst increasing their safety and independence on isolated tracks roads with the means to react efficiently if they become stuck. However, people should respect basic safety rules when driving on tracks.

The main applications are encountered when driving on sand, mud or other difficult tracks.

What is claimed is:

1. A vehicle pushing device suitable for moving wheeled vehicles stuck in sand, mud, snow or any soft and/or slippery surface, the device including in combination:

a) a set of chain of blocks, each chain of blocks comprising a plurality of blocks interconnected to one another by means of intermediate connecting elements and being unfolded in front of a corresponding wheel of a vehicle in order to provide a substantially thick supporting track, with sufficient length to guide the vehicle wheel until it is totally free, and to form a fixed anchoring point when the blocks are first slightly pulled under the wheel and then pressed into the ground by the weight of the moving vehicle; wherein a. said blocks being U-shaped width so that the distance between the upwards wings are spaced slightly wider than the width of the tire of said wheel, and the first block of a chain of blocks in relation to the engaged wheel being provided with a hooking device being aligned with a free end of said chain;

b. said connecting elements being made of a lightweight, flexible and resistant structure for allowing said chain of blocks to be easily stored and manipulated so as to copy the track profile, and to transmit a longitudinal pulling force from the first block to the remaining blocks, b) a set of connecting systems, one for each chain of blocks each of said connecting system being laid in front of and behind the sunken part of the wheel and being connected at its rear end to the hooking device of the corresponding chain of blocks and consisting of three main parts, a. an elongate front section, perpendicular to the longitudinal axis of the direction of the connecting system, with said elongated front section having a length corresponding to the tire width, and being fitted with a hooking device on the free side thereof;

b. an elongate rear section, perpendicular to the longitudinal axis of the direction of the connecting system, with said rear elongate rear section having a length corresponding to the tire width, and being fitted at its free side with a hooking device to be connected to the hooking device of the first block of the chain of blocks; and c. a lateral system, linking said front and rear parts and being mounted from a position above ground; said system insuring the continuity of a said longitudinal pulling force between said connecting system front and rear parts located respectively on the ground behind and in front of the wheel;

c) a set of connecting straps wherein said straps being flexible, non-elastic, having substantial tensile strength and adjustably attached at the rear end to the corresponding connecting system front part hooking device, and being pulled on the front end to exert on said hooking devices said pulling force approximately in line with the plane of the vehicle wheels, d) a force multiplying system configured to multiply the effort of at least one operator to provide in combination: said pulling force further transmitted by each strap to the chains of blocks via the connecting systems, and a resulting pushing force applied on contact points located at the rear of the vehicle, said combination of forces resulting in an initial backwards movement of the chains of blocks under the wheels of the vehicle until said chains of blocks are sufficiently anchored in the ground so that a displacement resulting from said pushing force applied on the rear of the vehicle gets the vehicle out of the soft soil.

2. Vehicle pushing device as defined in claim 1 characterized in that said contact points located at the rear of the vehicle being the vehicle trailer coupling device and said force multiplying system being a lever system referred to as a push bar comprising:

a) a main bar comprising:

a. several tubular elements made of lightweight and resistant material, said tubular elements being configured to be assembled and secured together, each element being transportable in the trunk of a car, b. a flattened portion fitted at the front end of the bar being provided with a hole that, with an associated pin connects said bar to the fixing assembly so as to facilitate vertical and horizontal rotations of said bar when connected to a vehicle trailer coupling device, c. lifting handles with corresponding rings, fitted on a bar near the rear end at the operator level, and said ring being used to connect the bar to a fix point at the top of the vehicle by means of a strap, allowing the operator to fasten the bar in lifted position or to lift the bar by pulling on the strap, d. a shovel fitted at the back end of the bar, said shovel having a runner shaped surface on which the bar can rest without touching the ground or slide easily when the system moves forward, b) a triangular part referred to as the triangle, said triangle being connected to the bar proximate its front end and having its base in a direction perpendicular to the bar main axis, the ends of said bar fitted with triangle end rings located approximately in line with the wheels plane and at a level underneath the level of the bar and receiving the front part of said connecting straps configured to transmit said pulling forces to the connecting systems, and the base of said triangular portion being reinforced by bracing bars;

c) a set of straps and buckles that pull and rigidify the different parts of the system, said straps being fitted with locking buckles for adjustment of the lengths or slacks or for fastening straps together, said system producing the combination of required pulling and pushing forces by the lifting of said bar or manipulation of a tie-down by an operator.

3. Vehicle pushing device as defined in claim 1, characterized in that the connecting system insures the continuity of the connection from the chain of blocks to the strap, is a rods connecting system and comprising:

a) a spreader forming the elongate front part of the connecting system, said spreader being fitted on its free side with a centered ring for connection to the strap, and on the other side with connections to a lateral system, b) a small removable connecting bar forming the elongate rear part, said small bar being designed for connection to the hooking device of the first block of the chain of blocks, c) two arched rods forming the lateral system, each of said rods being laid on one face of the wheel, being permanently connected on their front part to the spreader and having a hooked end or spigot suitable to fit in first holes in said block and to be secured in close position by said small removable connecting bar.

4. Vehicle pushing device as defined in claim 2 characterized in that the plane of said triangle is tilted forward in the car direction in order to increase the movement of the vehicle being lifted by the bar.

5. Vehicle pushing device as defined in claim 1 characterized in that said contact points located at the rear of the vehicle being the vehicle trailer coupling device and in that said force multiplying system is a lever system referred to as a push bar and comprising:

a) a main bar (1) comprising:

a. several tubular elements made of lightweight and tensile resistant material, said tubular elements being configured to be assembled and secured together, each element being transportable in the trunk of a car, b. a flattened portion fitted at the front end of the bar being provided with a hole that, with an associated pin that connects said bar to the fixing assembly so as to facilitate vertical and horizontal rotations of said bar when connected to the vehicle trailer coupling device, c. lifting handles with corresponding rings, fitted on the bar near the rear end at the operator level, and said ring being used to connect the bar to a fix point at the top of the vehicle by means of a strap, allowing the operator to fasten the bar in lifted position or to lift the bar by pulling on the strap, d. a shovel fitted at the rear end of the bar, said shovel having a runner shaped surface on which the bar can rest without touching the ground or slide easily when the system moves forward, b) a triangular part referred to as the triangle, said triangle being connected to the bar proximate its front end and having its base in a direction perpendicular to the bar main axis, the ends fitted with triangle end rings located approximately in line with the plane of the wheels and below the bar and receiving the front part of said connecting straps and configured to transmit said pulling forces to the connecting systems, and the base of said triangular portion being reinforced by bracing bars;

c) a set of straps and buckles that pull and rigidify the different parts of the system, said straps being fitted with locking buckles for adjustment of the lengths or slacks or for fastening straps together, said system producing the combination of required pulling and pushing forces by the lifting of said bar or manipulation of a tie-down by an operator.

6. Vehicle pushing device as defined in claim 1 characterized in that said contact points located at the rear of the vehicle being the vehicle trailer coupling device and in that said force multiplying system being a lever system referred to as a tilting push bar, and comprising:

a) a main bar comprising:

a. several tubular elements made of lightweight and resistant material, said tubular elements being configured to be assembled and secured together, each element being transportable in the trunk of a car, b. a flattened portion fitted at the front end of the bar being provided with a hole that, with an associated pin connecting said bar to the fixing assembly so as to facilitate vertical and horizontal rotations of said bar when connected to the vehicle trailer coupling device, c. lifting handles with corresponding rings, fitted on the bar near the rear end at the operator level, and said ring being used to connect the bar to a fix point at the top of the vehicle by means of a strap, allowing the operator to fasten the bar in lifted position or to lift the bar by pulling on the strap, d. a shovel fitted at the back end of the bar, said shovel having a runner shaped surface on which the bar can rest without touching the ground or slide easily when the system moves forward, b) a triangular part referred to as the triangle, said triangle being connected to the bar proximate its front end and having its base in a direction perpendicular to the longitudinal axis of the bar, the ends fitted with triangle end rings located approximately in line with the plane of the wheels and below the bar and receiving the front part of said connecting straps and configured to transmit said pulling forces to the connecting systems, and being connected to the main bar via a vertical triangle bar having spaced holes in two perpendicular directions and rotating around a horizontal triangle pivot axle located just underneath the main bar near its front end and said triangular portion wherein said triangle being fitted around said vertical triangle guide bar and being rotatable freely around said horizontal axle and to have, its position adjusted by the insertion of pin in one of the holes of said vertical triangle guide bar, c) a set of straps and buckles that pull and rigidify different parts of the system said straps being fitted with locking buckles for adjusting the lengths of slacks or for fastening straps together, and a pair of said straps being attached to the triangle end rings and being pulled by a tie-down attached to the end of said bar, said arrangement allowing the pushing action the combination of required pulling and pushing forces by lifting the bar or by direct action of the operator on the tie-down and rotation of the triangle around a horizontal axis.

7. Vehicle pushing device as defined in claim 1 characterized in that said contact points located at the rear of the vehicle being the vehicle trailer coupling device and in that said force multiplying system being a lever system referred to as a push bar and comprising:

a) a main bar comprising:

a. several tubular elements made of lightweight and resistant material, said tubular elements being configured to be assembled and secured together, each element being transportable in the trunk of a car, b. a flattened portion at the front end of the bar being provided with a hole that, with an associated pin connects said bar to the fixing assembly so as to facilitate vertical and horizontal rotations of said bar when connected to the vehicle trailer coupling device, c. lifting handles with corresponding rings, fitted on the bar near the rear end at the operator level, and said ring being used to connect the bar to a fix point at the top of the vehicle by means of a strap, allowing the operator to fasten the bar in lifted position or to lift the bar by pulling on the strap, d. a shovel fitted at the rear end of the bar, said shovel having a runner shaped surface on which the bar can rest without touching the ground or slide easily when the system moves forward, b) a triangular part referred to as the triangle, said triangle being connected proximate front end of said bar and having a base in a direction perpendicular to the longitudinal axis of said bar, the ends of said triangle base being fitted with triangle end rings located approximately in line with the plane of said wheels and at a plane below the plane of the bar, said end ring being fitted with an idler pulley around which runs the connecting straps, the front end of said connecting straps being fixed to a point on the vehicle structure, e) a set of straps and buckles that pull and rigidify the different parts of the system, said straps being fitted with locking buckles for the adjustment of the lengths or slacks or for fastening straps together, said system producing the combination of required pulling and pushing forces by the lifting of the bar by the operator, and using the pulley system for almost doubling the ratio of the displacement over the bar lift.

8. Vehicle pushing device as defined in claim 1 characterized in that said contact points located at the back of the vehicle being the vehicle trailer coupling device and in that said force multiplying system is a lever system referred to as a push bar and comprising:

a) a main bar comprising:

a. several tubular elements made of lightweight and resistant material, said tubular elements being configured to be assembled and secured together, each element being transportable in the trunk of a car, b. a flattened piece fitted at the front end of the bar being provided with a hole that, with an associated pin connects said bar to the fixing assembly so as to facilitate vertical and horizontal rotations of said bar when connected to the vehicle trailer coupling device, c. lifting handles and ring, fitted on the bar near the rear end at the operator level, said lifting handles being used for action by two operators, and said ring being used to connect the bar to a fix point at the top of the vehicle by means of a strap, allowing the operator to fasten the bar in lifted position or to lift the bar by pulling on the strap, d. a shovel fitted at the rear end of the bar, said shovel having a runner shaped surface on which the bar can rest without touching the ground or slide easily when the system moves forward, b) a triangular part referred to as the triangle, said triangle being connected to the bar near its front end and having its base in a direction perpendicular to the bar main axis, the ends of said triangle base being fitted with triangle end rings located approximately in line with the plane of the wheels and at a level underneath the plane of the bar and receiving the front part of the connecting straps fixed to said bar to transmit the pulling forces to towards the connecting systems, c) an idler pulley being located at the end of said connecting system, one end of said straps being fastened to said triangle end ring and the loose end going through said pulley wheel and then being fastened to a fix point at the rear of the car, d) a set of straps and buckles that pull and rigidify different parts of the system, said straps being fitted with locking buckles for the adjustment of the lengths or slacks or for fastening straps together, said system producing the combination of required pulling and pushing forces by the lifting of the bar by the operator, and using said pulley system for almost doubling the pushing force.

9. Vehicle pushing device as defined in claim 1 characterized in that said force multiplying system comprising:

a) a main bar (1) comprising:

a. several tubular elements made of lightweight and resistant material, said tubular elements being configured to be assembled and secured together, each element being transportable in the trunk of a car, b. a flattened piece fitted at the front end of the bar being provided with a hole that, with an associated pin, connects said bar to the fixing assembly so as to facilitate vertical and horizontal rotations of said bar when connected to the vehicle trailer coupling device, c. a ring, said ring fitted on the bar near the front end thereof, and wherein said ring being used to pass the end of the connecting straps therethrough, d. a shovel fitted at the rear end of the bar, said shovel having a runner-shaped surface on which the bar can rest without touching the ground or slide easily when the system moves forward, b) a triangular part referred to as the triangle, said triangle being connected to the bar near its front end and having its base in a direction perpendicular to the longitudinal axis of the bar, the ends of said triangle base being fitted with an idler pulley located approximately in line with the plane of the wheels and at a plane beneath the plane of the bar and the front part of the connecting straps being guided by said pulleys to transmit the pulling forces to the connecting systems, said triangle base ends being reinforced in the longitudinal direction of the bar by bracing bars, c) a tie-down or winch being connected to the free ends of the connecting straps and acting to produce the pulling force on the connecting straps, said system producing the combination of required pulling and pushing forces by the action of the operator on the tie-down.

10. A vehicle pushing device suitable for moving wheeled vehicles stuck in sand, mud, snow or any soft and/or slippery surface, the device including in combination:

a) a set of chain of blocks, each chain of blocks comprising a plurality of blocks interconnected to one another by means of intermediate connecting elements and being unfolded in front of a corresponding wheel of a vehicle in order to provide a substantially thick supporting track, having sufficient length to guide the vehicle wheel until it is totally free, and to form a fixed anchoring point when the blocks are first slightly pulled under the wheel and then pressed into the ground by the weight of the moving vehicle; wherein a. said blocks being U-shaped width so that the distance between the upwards wings are spaced slightly wider than the width of the tire of said wheel, and the first block of the chain in relation to the engaged wheel being provided with a hooking device being aligned with a free end of said chain;

b. said connecting elements being made of a lightweight, flexible and resistant structure for allowing said chain of blocks to be easily stored and manipulated so as to copy the track profile, and to transmit a longitudinal pulling force from the first block to the remaining blocks, b) a set of connecting systems, one for each chain of blocks, each of said connecting system being laid respectively in front of and behind the sunken portion of the wheel and being connected at its rear end to the hooking device of the corresponding chain of blocks and consisting in three main parts made of a material having substantial tensile strength, a. an elongate front part, perpendicular to the longitudinal direction of the connecting system, and having a length corresponding to the width of the tire, and being fitted with a hooking device on its free side, b. an elongate rear part, perpendicular to the longitudinal direction of the connecting system, and having a length corresponding to the tire width, and being fitted at its free side with a hooking device to be connected to the hooking device of the first block of the chain of blocks, c. a lateral system, linking said front and rear parts and being mounted from a position above ground; said system insuring the continuity of a said longitudinal pulling force between said connecting system front and rear parts located respectively on the ground behind and in front of the wheel;

c) a set of connecting straps wherein said straps being flexible, non-elastic, having substantial tensile strength and adjustably attached at the rear end to the a hooking device located at the front end of the corresponding connecting system, and being pulled on the front end to exert on said hooking devices said pulling force approximately aligned with the plane of the vehicle wheels, d) a force multiplying system configured to multiply the effort of at least one operator to provide in combination: said pulling force further transmitted by each strap to the chains of blocks via the connecting systems, and a resulting pushing force applied on the trailer coupling device at the rear of the vehicle, said force multiplying system being a lever system referred to as a double bar and consisting of:

a. an upper half bar comprising:

i. several tubular elements made of lightweight and resistant material, said tubular elements being secured together, ii. a flattened piece fitted at the front end of the bar being provided with a hole that, with an associated pin connecting said bar to the fixing assembly so as to facilitate vertical and horizontal rotations of said bar when connected to the vehicle trailer coupling device, iii. a ring and a strap with self-locking buckle, fitted on the bar near the rear end at the operator level, said ring and straps being used to connect said half bar to the corresponding second half bar iv. an outer half triangular part referred to as the outer half triangle, said half triangle being connected to said upper half bar proximate the front end thereof, having a vertical side and an horizontal base in a plane perpendicular to said upper half bar, the end of said triangle base being fitted with a triangle end ring located approximately in line with the plane of the wheels and at a plane beneath the plane of the bar and receiving the front part of the connecting straps fixed to said bar to transmit the pulling forces to the connecting systems, v. a strap and buckles linking the back end of the half bar to the half triangle end ring, b. a lower half bar located slightly located below said upper half bar and comprising:

i. several tubular elements made of lightweight and resistant material, said tubular elements being secured together, ii. a ring and a straps with self a locking buckle, fitted on the bar near the rear end at the operator level, said ring and straps being used to connect the said half bar to the corresponding second half bar, iii. an inner half triangular part referred to as the inner half triangle, said half triangle being connected to the said lower half bar near the front end of said half bar, having a vertical side and an horizontal base in a plane perpendicular to the said half bar, said horizontal base of said inner half triangle being located slightly above the base of said outer half triangle, and its end being fitted with a triangle end ring located approximately in line with the plane of the wheels and at a plane beneath the plane of the bar and receiving the front part of the connecting straps fixed to it to transmit said pulling forces to the connecting systems, and the vertical side being open and of larger diameter than the outer half triangle vertical side so that said outer half triangle side can rotate freely as soon as the open shape is closed by enclosing pins or bearings, a vertical thrust also being added to the vertical element to stop any relative axial displacement, iv. a set of straps and buckles that link the back end of the half bar to the half triangle end ring; wherein said combination of forces resulting in a slight initial backwards movement of the chains of blocks under the wheels of the vehicle until said chains of blocks are anchored enough in the ground so that a displacement resulting from said pushing force applied on the rear of the vehicle gets the vehicle out of the soft soil, and said arrangement providing a significant displacement of the vehicle when starting from a position where the two half bars are horizontal and spread apart and then are joined in the middle position and lifted.

11. Vehicle pushing device as defined in claims 1 characterized in that said sets of chains of blocks being limited to 2 chains of blocks fitting only the front wheels of the vehicle and said force multiplying system being a winch fixed on said contact points located in the trailer coupling system.

12. A vehicle pushing device suitable for moving wheeled vehicles stuck in sand, mud, snow or any soft and/or slippery surface, the device including in combination:

a) a set of chain of blocks, each chain of blocks comprising a plurality of blocks interconnected to one another by means of intermediate connecting elements and being unfolded in front of a corresponding wheel of a vehicle in order to provide a substantially thick supporting track, with sufficient length to guide the vehicle wheel until it is totally free, and to form a fixed anchoring point when the blocks are first slightly pulled under the wheel and then pressed into the ground by the weight of the moving vehicle; wherein a. said blocks being made of a lightweight material and having a U-shaped width itself characterized by a distance between the upwards wings having a width being slightly wider than the tire of the wheel it is meant to guide, and the first block of the chain in relation to the concerned wheel being provided with a hooking device is aligned with the chain at the free end thereof, b said connecting elements being made of a lightweight, flexible and resistant structure for allowing said chain of blocks to be easily stored and manipulated so as to copy the track profile, and to transmit a longitudinal pulling force from the first block to the remaining blocks, b) a set of connecting systems, one for each chain of blocks each of said connecting system being laid in front of and behind the sunken part of the wheel and being connected at the rear end thereof to the hooking device of the corresponding chain of blocks and consisting of three main parts, a. an elongate front part, perpendicular to the longitudinal axis of the direction of the connecting system, and having a length corresponding to the tire width, and being fitted with a hooking device on the free thereof, b. an elongate rear part, perpendicular to the connecting system main direction, having a length corresponding to the tire width, and being fired at its free side with a hooking device to be connected to the hooking device of the first block of the chain of blocks, c. a lateral system, linking said front and rear parts and being mounted from a position above ground; said system insuring the continuity of a said longitudinal pulling force between said connecting system front and rear parts located respectively on the ground behind and in front of the wheel;

c) a set of connecting straps wherein said straps being flexible, non-elastic, having substantial tensile strength and adjustably attached at the rear end to the corresponding connecting system front part hooking device, and being pulled on the front end to exert on said hooking devices said pulling force approximately aligned with the plane of the vehicle wheels, d) a force multiplying system configured to multiply the effort of at least one operator to provide in combination: said pulling force further transmitted by each strap to the chains of blocks via the connecting systems, and a resulting pushing force applied on contact points located at the rear of the vehicle, said contact points and force multiplying system comprising:

a. a set of two rings connected by a pivot or linkage to the rear structure of the chassis of the vehicle as low as possible beneath the bumper and closely aligned with the plane of the wheels, said rings allowing an easy change in direction of the connecting strap that is pulled therethrough, b. a double wind winch with a wheel, a non-return system and a drum, said winch being fixed on the vehicle by a base plate and, when the ends of the connecting straps are pulled by the operator, a pushing force is induced at the linkage level, said combination of forces resulting initial backwards movement of the chains of blocks under the wheels of the vehicle until said chains of blocks are anchored enough in the ground so that a displacement resulting from said pushing force applied on the rear of the vehicle gets the vehicle out of the soft soil.

13. Vehicle pushing device as defined in any one of claim 1, 2, 5, 6, 7, 8, 10, 9, 12 or 11 characterized in that said connecting system that insures the continuity of connection from the chain of blocks to the strap is an adjustable bar connecting system to be positioned on the outer face of the wheel, without a need to access the inside face of the wheel and consists of front and rear parts having edged surface facing the central part of the system and a length being approximately equal to the tire width, said rear edged part being connected by a set of rings or spigots to the chain of blocks and said front edged part being connected by a linking ring to the pulling strap, both parts being kept parallel and being joined together on their outside end by bar having a length that is adjustable the positioning of a pin in one of the several holes drilled in the telescopically disposed part of the adjustable bar according to the size of the tire and the depth of the wheel in the track.

14. Vehicle pushing device as defined in any one of claim 1, 2, 5, 6, 7, 8, 10, 9, 12 or 11 characterized in that plough shares are added to the lower part of the blocks to increase the grip on the ground.

15. Vehicle pushing device as defined in any one of claim 1, 2, 5, 6, 7, 8, 10, 9, 12 or 11 characterized in that: the blocks of the chain of blocks and the connecting elements are combined to form a thick rubber strip with a rough lower surface.

16. Vehicle pushing devise as defined in any one of claim 1, 2, 5, 6, 7, 8, 10, 9, 12 or 11 characterized in that a vehicle non-return system is added to the set of equipment, said non return system comprising: a bale plate being fixed at the bottom end of a lever said lever being fitted at its upper end by a forked end configured to be hinged onto a chassis beam at the rear part of the vehicle, said base plate sliding on the ground during a forward movement of the car and preventing any backward movement of the car.

17. Vehicle pushing device as defined in any one of claim 1, 12 or 11, characterized in that the types of tie-downs and manual or electrical winches used in the description of various arrangements can be switched.

18. Vehicle pushing device as defined in anyone of claim 1, 2, 5, 6, 7, 8, 10, 9, or 12 characterized in that said sets of chains of blocks, sets of connecting systems and sets of connecting straps consist of one set of chain of blocks, connecting system, connecting strap for each rear wheel of the vehicle, a set of similar chain of blocks, connecting device, connecting strap is fitted for each front wheel of the vehicle, said sets being connected by the free end of the connecting strap to the rear end of the rear wheels chains of blocks.

* * * * *